United States Patent
Chen et al.

(10) Patent No.: US 11,233,276 B2
(45) Date of Patent: Jan. 25, 2022

(54) LITHIUM SLURRY BATTERY SYSTEM

(71) Applicants: Beijing Hawaga Power Storage Technology Company Ltd., Beijing (CN); Hebei Mayjoy Battery Company Ltd., Hebei (CN)

(72) Inventors: Yongchong Chen, Beijing (CN); Yingyuan He, Beijing (CN); Bin Zhang, Beijing (CN); Yuwei Wang, Beijing (CN); Yanping Zhang, Beijing (CN)

(73) Assignees: Beijing Hawaga Power Storage Technology Company Ltd., Beijing (CN); Hebei Mayjoy Battery Company Ltd., Hebei (CN)

( * ) Notice: Subject to any disclaimer, the term of this patent is extended or adjusted under 35 U.S.C. 154(b) by 282 days.

(21) Appl. No.: 16/496,584

(22) PCT Filed: Apr. 4, 2018

(86) PCT No.: PCT/CN2018/081917
§ 371 (c)(1),
(2) Date: Sep. 23, 2019

(87) PCT Pub. No.: WO2018/184566
PCT Pub. Date: Oct. 11, 2018

(65) Prior Publication Data
US 2020/0321663 A1    Oct. 8, 2020

(30) Foreign Application Priority Data

Apr. 7, 2017  (CN) .......................... 201710224927.7
Aug. 18, 2017  (CN) .......................... 201710710934.8
Oct. 24, 2017  (CN) .......................... 201710997294.3

(51) Int. Cl.
*H01M 10/42* (2006.01)
*H01M 10/0525* (2010.01)
(Continued)

(52) U.S. Cl.
CPC ......... *H01M 10/4214* (2013.01); *H01M 8/18* (2013.01); *H01M 10/0525* (2013.01); *H01M 50/691* (2021.01)

(58) Field of Classification Search
CPC .......................... H01M 10/4214; H01M 8/18
See application file for complete search history.

(56) References Cited

U.S. PATENT DOCUMENTS 4,042,760 A    8/1977   Land
6,161,579 A   12/2000   Vulliet
(Continued)

FOREIGN PATENT DOCUMENTS

CA    983103 A    2/1976
CN   2269505 Y   12/1997
(Continued)

OTHER PUBLICATIONS

First Office Action dated Oct. 31, 2019 for Chinese Application No. 201710224927.7, 8 pages.
(Continued)

*Primary Examiner* — Ula C Ruddock
*Assistant Examiner* — Thomas H. Parsons
(74) *Attorney, Agent, or Firm* — Patterson Thuente Pederson, P.A.

(57) ABSTRACT

A lithium slurry battery system is provided. The system includes a lithium slurry battery and a maintenance and regeneration equipment for the battery. The battery includes: a case, a cell core accommodated in the case, and a cover butting device. The case is provided with a cover and a case body. The cover butting device is arranged on the cover and
(Continued)

is provided with a first cover port and a second cover port. The maintenance and regeneration equipment includes: a gas storage tank for storing gas, a liquid storage tank for storing liquid; a gas recovery storage tank for storing gas recovered from the lithium slurry battery; a liquid recovery storage tank for storing liquid recovered from the lithium slurry battery; and an equipment butting device provided with a first equipment port and a second equipment port.

21 Claims, 14 Drawing Sheets

(51) Int. Cl.
*H01M 50/691* (2021.01)
*H01M 8/18* (2006.01)

(56) References Cited

U.S. PATENT DOCUMENTS

| | | | |
|---|---|---|---|
| 10,868,337 | B2 | 12/2020 | Chen et al. |
| 2010/0068605 | A1 | 3/2010 | Harris et al. |
| 2011/0086249 | A1 | 4/2011 | Timmons |
| 2011/0108134 | A1 | 5/2011 | Nishimura et al. |
| 2012/0114986 | A1 | 5/2012 | Kim et al. |
| 2013/0055559 | A1 | 3/2013 | Slocum et al. |
| 2013/0252092 | A1 | 9/2013 | Huang |
| 2015/0093629 | A1 | 4/2015 | Sayre et al. |
| 2016/0329569 | A1 | 11/2016 | Chen et al. |
| 2016/0372763 | A1 | 12/2016 | Lu et al. |

FOREIGN PATENT DOCUMENTS

| | | | |
|---|---|---|---|
| CN | 2293698 | Y | 10/1998 |
| CN | 1251215 | A | 4/2000 |
| CN | 1268213 | A | 9/2000 |
| CN | 2779204 | Y | 10/2006 |
| CN | 2830854 | Y | 10/2006 |
| CN | 1870326 | A | 11/2006 |
| CN | 101552356 | A | 10/2009 |
| CN | 101872881 | A | 10/2010 |
| CN | 102044722 | A | 5/2011 |
| CN | 102055010 | A | 5/2011 |
| CN | 102263206 | A | 11/2011 |
| CN | 102315454 | A | 1/2012 |
| CN | 102473863 | A | 5/2012 |
| CN | 202259549 | U | 5/2012 |
| CN | 102610830 | A | 7/2012 |
| CN | 102637890 | A | 8/2012 |
| CN | 102664280 | A | 9/2012 |
| CN | 102709596 | A | 10/2012 |
| CN | 103094619 | A | 5/2013 |
| CN | 103367691 | A | 10/2013 |
| CN | 103943876 | A | 7/2014 |
| CN | 104040764 | A | 9/2014 |
| CN | 104124460 | A | 10/2014 |
| CN | 104701504 | A | 6/2015 |
| CN | 104779402 | A | 7/2015 |
| CN | 104795583 | A | 7/2015 |
| CN | 105186006 | A | 12/2015 |
| CN | 105280942 | A | 1/2016 |
| CN | 204946946 | U | 1/2016 |
| CN | 105449251 | A | 3/2016 |
| CN | 106159302 | A | 11/2016 |
| CN | 106207271 | A | 12/2016 |
| CN | 206040871 | U | 3/2017 |
| CN | 107171018 | A | 9/2017 |
| CN | 107681115 | A | 2/2018 |
| DE | 102014221300 | A1 | 4/2016 |
| EP | 1018775 | A1 | 7/2000 |
| JP | S52147737 | A | 12/1977 |
| JP | S5631069 | B2 | 7/1981 |
| JP | 2010218986 | A | 9/2010 |
| JP | 2014056799 | A | 3/2014 |
| KR | 20130046999 | A | 5/2013 |
| WO | WO-2013065942 | A1 | 5/2013 |
| WO | WO-2013093044 | A1 | 6/2013 |
| WO | WO-2016205663 | A1 | 12/2016 |

OTHER PUBLICATIONS

First Office Action dated Dec. 20, 2019 for Chinese Application No. 201710710934.8, 28 pages.
Office Action dated Dec. 12, 2020 for Chinese Application No. 201710997294.3, 9 pages.
International Search Report (with translation) and Written Opinion for PCT/CN2018/081917, dated Jun. 19, 2018 (8 pgs).
First Office Action for Chinese Application No. 201610621508.2, dated Jul. 26, 2019, 20 pages.
First Office Action for Chinese Application No. 201611202373.2, dated Nov. 22, 2019, 22 pages.
International Search Report for Application No. PCT/CN2017/075925, dated Jun. 16, 2017, (Original Search Report—3 pages, English translation—2 pages) (5pages total).
Office Action for Chinese Application No. 201610128524.8, dated Dec. 24, 2018, 8 pages.
Office Action for Chinese Application No. 201610620726.4, dated Jul. 26, 2019, 12 pages.
Office Action for Chinese Application No. 201710058336.7, dated Jul. 25, 2019, 10 pages.
Office Action for Chinese Application No. 201710058490.4, dated Aug. 5, 2019, 2 pages.
Second Office Action for Chinese Application No. 201710053604.6, dated Apr. 30, 2020, 24 pages.

LITHIUM SLURRY BATTERY SYSTEM

The present application is the national phase of PCT International Patent Application PCT/CN2018/081917, filed on Apr. 4, 2018, which claims priorities to Chinese Patent Application No. 201710224927.7, titled "MAINTENANCE AND REGENERATION EQUIPMENT AND METHOD FOR LITHIUM SLURRY BATTERY", filed on Apr. 7, 2017 with the Chinese Patent Office, Chinese Patent Application No. 201710710934.8, titled "BUTTING DEVICE FOR LITHIUM SLURRY BATTERY AND MAINTENANCE AND REGENERATION EQUIPMENT THEREFOR", filed on Aug. 18, 2017 with the Chinese Patent Office, and Chinese Patent Application No. 201710997294.3, titled "LIQUID REPLACEABLE LITHIUM SLURRY BATTERY", filed on Oct. 24, 2017 with the Chinese Patent Office, all of which are incorporated herein by reference in their entireties.

FIELD

The present disclosure relates to the field of lithium slurry batteries, and in particular to a maintainable and renewable lithium slurry battery system.

BACKGROUND

In a lithium slurry battery as a type of high energy batteries, a conductive slurry in an electrode piece contains a certain proportion of conductive particles that are suspended or precipitated in an electrolyte. When the battery is subjected to an external shock or vibration, the conductive particles move in the electrolyte and a dynamic conductive network is formed, which is caused by the fact that the certain proportion of conductive particles that are suspended or precipitated in an electrolyte are not bonded and fixed. With use of the conductive slurry in the lithium slurry battery, problems existing in a conventional lithium battery of decreased battery capacity and reduced cycle life due to exfoliation or looseness of an electrode material can be avoided.

However, the following problems may occur during a long-time use of the lithium slurry battery.

(1) A side reaction generated during the use of the lithium slurry battery causes the electrolyte to gradually fail, and an SEI film generated on a surface of an electrode active material or even a current collector due to the side reaction is gradually thickened, which results in increased internal resistance and reduced cycle life of the lithium slurry battery.

(2) The side reaction generated during the use of the lithium slurry battery consumes the electrolyte, which results in too little electrolyte in the battery participating in an electrochemical reaction, affects conduction of lithium-ions in the battery, and further reduces performance of the battery.

(3) During the use of the lithium slurry battery, overcharge and overdischarge of the battery or the generated side reaction may cause swelling of the battery and a high gas pressure in the cell case, but on the other hand, the gas pressure in the battery may be decreased due to the long-time use, so that the gas sealing cannot be achieved, and thus resulting in decreased security and sealing of the battery.

Based on the self-characteristics of the lithium slurry battery, the service life of the battery can be prolonged by maintenance and regeneration, to improve the performance of the battery.

SUMMARY

In view of the above problems, a lithium slurry battery system is provided in the present disclosure. The lithium slurry battery system includes a lithium slurry battery and a maintenance and regeneration equipment for the lithium slurry battery. The lithium slurry battery may conveniently butt against the maintenance and regeneration equipment by using a cover butting device of the lithium slurry battery and an equipment butting device of the maintenance and regeneration equipment, to inject gas in a gas storage tank or liquid in a liquid storage tank of the maintenance and regeneration equipment into the lithium slurry battery, or to discharge gas or liquid in the lithium slurry battery to a gas recovery storage tank or a liquid recovery storage tank of the maintenance and regeneration equipment. In this way, operations such as liquid injection, liquid replenishment, liquid replacement, gas injection and gas discharge can be performed on the lithium slurry battery, to improve service performance, security and sealing of the battery and prolong service life of the battery, thereby achieving maintenance and regeneration of the lithium slurry battery.

The following technical solutions are provided in the present disclosure.

A lithium slurry battery system is provided in the present disclosure. The lithium slurry battery system includes a lithium slurry battery and a maintenance and regeneration equipment for the lithium slurry battery. The lithium slurry battery includes: a case, a cell core and a cover butting device. The case is provided with a cover and a case body. The cell core is accommodated in the case. The cover butting device is arranged on the cover and is provided with a first cover port and a second cover port. The maintenance and regeneration equipment includes a gas storage tank, a liquid storage tank, a gas recovery storage tank, a liquid recovery storage tank and an equipment butting device. The gas storage tank and the liquid storage tank are respectively used to store gas and liquid. The gas recovery storage tank and the liquid recovery storage tank are respectively used to store gas and liquid recovered from the lithium slurry battery. The equipment butting device is provided with a first equipment port and a second equipment port. The first cover port can butt against the first equipment port, and the second cover port can butt against the second equipment port, to inject the gas stored in the gas storage tank or the liquid stored in the liquid storage tank into the lithium slurry battery, or to discharge gas or liquid in the lithium slurry battery into the gas recovery storage tank or the liquid recovery storage tank. By the cover butting device conveniently butting against the equipment butting device, the maintenance and regeneration equipment can quickly and easily perform maintenance and regeneration operations such as liquid injection, liquid replenishment, liquid replacement, gas injection and gas discharge on the lithium slurry battery. It should be noted that terms such as "first" and "second" used herein are merely for illustration rather than limitation.

The cell core of the lithium slurry battery is formed by multiple positive pieces and multiple negative pieces that intersect with each other and are stacked with each other, and a separator between a positive piece and a negative piece. A cathode slurry may be provided for the positive electrode pieces, and a anode slurry or a lithium-contained metal body may be provided for the negative electrode pieces. Electric-conductive cathode particles that are not bonded and fixed and/or lithium-storage electric-conductive anode particles that are not bonded and fixed may move in an electrolyte, and respectively form the cathode slurry and/or the anode slurry. A mass ratio of the electric-conductive cathode particles in the cathode slurry may be 10% to 90%, and preferably 15% to 80%. A mass ratio of the lithium-storage electric-conductive anode particles in the anode slurry may be 10% to 90%, and preferably 15% to 80%. An average particle diameter of the electric-conductive cathode particles may be 0.05 μm to 500 μm. A mass ratio of a cathode active material to a conductive agent may be 20~98:80~2. An average particle diameter of the lithium-storage electric-conductive anode particles may be 0.05 μm to 500 μm. A mass ratio of a lithium-storage anode active material to the conductive agent may be 20~98:80~2. The cathode active material may be one or more of lithium iron phosphate, lithium manganese phosphate, lithium silicate, lithium iron silicate, a sulfate compound, sulfur carbon composite, a sulfur substance, a titanium sulfur compound, a molybdenum sulfur compound, an iron sulfur compound, doped lithium manganese oxide, lithium cobalt oxide, lithium titanium oxide, lithium vanadium oxide, lithium nickel manganese oxide, lithium nickel cobalt oxide, lithium nickel cobalt aluminum oxide, lithium nickel aluminum oxide, lithium nickel cobalt manganese oxide, and lithium iron nickel manganese oxide. The lithium-storage anode active material may be one or more of aluminum base alloy, silicon base alloy, tin base alloy, germanium base alloy, lithium titanium oxide, lithium silicon oxide, lithium metal powder, and graphite. The conductive agent may be one or more of carbon black, ketjen black, graphene, carbon nanotube, carbon fiber, amorphous carbon, metal conductive particles, and metal conductive fiber. The metal conductive particles or the metal conductive fiber may be made of aluminum, stainless steel, silver or the like. The lithium-contained metal body may be made of lithium metal or lithium base alloy, and a thickness of the lithium-contained metal body is preferably 0.001 mm to 2 mm. The lithium-contained metal body may have a single-layer structure or a multi-layer structure. The lithium base alloy may be Li—Al, Li—Si, Li—Mg, Li—Sn, i-Bi, Li—Sb, or the like, and may be binary alloy, ternary alloy, or multicomponent alloy. The alloy may include an element that can form solid solution with lithium and/or can perform an addition reaction with lithium, such as Mg, Ca, Al, Si, Ge, Sn, Pb, As, Sb, Bi, Pt, Ag, Au, Zn, Cd, Hg and so on, where the content of the element in the alloy other than lithium is not greater than 50%. In a case that the lithium-contained metal body has a multi-layer structure, the layers may be made of the same material or different materials.

In a butting process between the cover butting device and the equipment butting device, the first cover port and the second cover port of the cover butting device are required to respectively butt against the first equipment port and the second equipment port of the equipment butting device. The first cover port may be provided with a first opening and a first opening switch mechanism. The first opening extends through the cover. The first opening switch mechanism is arranged in the first opening to control a fluid passage in the first opening to be enabled or to be cut off. The second cover port may be provided with a second opening and a second opening switch mechanism. The second opening extends through the cover. The second opening switch mechanism is arranged in the second opening to control a fluid passage in the second opening to be enabled or to be cut off. The first equipment port may be provided with a first mounting hole and a first trigger mechanism. The first mounting hole is located at a position corresponding to the first opening. The first trigger mechanism is arranged in the first mounting hole. The second equipment port may be provided with a second mounting hole and a second trigger mechanism. The second mounting hole is located at a position corresponding to the second opening. The second trigger mechanism is arranged in the second mounting hole. The first trigger mechanism and the second trigger mechanism are used to respectively trigger the first opening switch mechanism and the second opening switch mechanism to separately or concurrently open the first opening switch mechanism and the second opening switch mechanism, to form fluid communication between the first cover port and the first equipment port and/or between the second cover port and the second equipment port. The first trigger mechanism and the second trigger mechanism are further used to respectively trigger the first opening switch mechanism and the second opening switch mechanism to separately or concurrently close the first opening switch mechanism and the second opening switch mechanism, to cut off the fluid communication between the first cover port and the first equipment port and/or between the second cover port and the second equipment port. That is, the first opening switch mechanism and the second opening switch mechanism are generally in a closed state, and the fluid passage is enabled only after the first opening switch mechanism and the second opening switch mechanism are opened by the trigger mechanisms. A position and a structure of the first trigger mechanism correspond to a position and a structure of the first opening switch mechanism, and a position and a structure of the second trigger mechanism correspond to a position and a structure of the second opening switch mechanism.

The cover butting device may be further provided with a cover butting device engagement portion. The cover butting device engagement portion is an outer wall extending upwards from the cover and continuously surrounding the first cover port and the second cover port. The cover butting device engagement portion is provided with a first groove. A first sealing member is arranged in the first groove. The first groove may be arranged on a top surface or a sidewall of the cover butting device engagement portion. Accordingly, the equipment butting device may be further provided with an equipment butting device engagement portion. The equipment butting device engagement portion is an outer wall continuously surrounding the first equipment port and the second equipment port, and the equipment butting device engagement portion can engage with or disengage from the cover butting device engagement portion. In a case that the equipment butting device engagement portion engages with the cover butting device engagement portion, a cavity is formed. The cavity can be vacuumized or be filled with a noble gas or a flame retardant gas. The cavity is sealed by the first sealing member to prevent external moisture or air from getting into the cavity. Both the cover butting device engagement portion and the equipment butting device engagement portion may be continuous outer walls. In the process that the cover butting device butts against the equipment butting device, a cavity for accommodating the first opening switch mechanism, the second opening switch mechanism, the first trigger mechanism and the second trigger mechanism is formed by the cover butting device engagement portion and the equipment butting device engagement portion, and the internal cavity formed by the cover butting device engagement portion and the equipment butting device engagement portion is sealed from outside by using a sealing structure. The operations on the lithium slurry battery such as the liquid injection, the liquid replacement, the gas replenishment and the gas discharge, have requirements on contents of oxygen and moisture. Therefore, in a case that no auxiliary device such as a vacuum box is used, the isolation from the outside may be achieved by the cavity formed by the cover butting device engagement portion and the equipment butting device engagement portion. Preferably, the cavity may be vacuumized or be filled with the noble gas or the flame retardant gas via the first equipment port, the second equipment port, or an independent port provided on the equipment butting device, to further ensure security of the maintenance and regeneration operation. Alternatively, or for further ensuring the sealing, each of the first trigger mechanism and the second trigger mechanism may be provided with an inner insertion wall and a second groove surrounding the inner insertion wall, and a second sealing member may be arranged in the second groove. Each of the first opening switch mechanism and the second opening switch mechanism may be provided with an outer insertion wall, and a boss portion located in a bore of the outer insertion wall, and a third sealing member may be arranged on the boss portion. The outer insertion wall of each of the first opening switch mechanism and the second opening switch mechanism can be inserted into the second groove to form a sealing arrangement by the second sealing member. The inner insertion wall of each of the first trigger mechanism and the second trigger mechanism can be abutted against the boss portion to form a sealing arrangement by the third sealing member. In this way, multiple sealing arrangements are formed in the cover butting device and the equipment butting device. Butting sealing between the cover butting device engagement portion and the equipment butting device engagement portion and butting sealing between the trigger mechanism and the opening switch mechanism may be performed concurrently or stepwise. In other words, the butting sealing between the trigger mechanism and the opening switch mechanism is performed when or after the butting sealing between the cover butting device engagement portion and the equipment butting device engagement portion is performed.

The equipment butting device engagement portion may be connected with the cover butting device engagement portion by thread connection, insertion, snap connection or the like. In the case of thread connection, the equipment butting device engagement portion and the cover butting device engagement portion are cylinders or in a cylindrical shape and have a same external diameter. Each of the equipment butting device engagement portion and the cover butting device engagement portion is provided with an external thread. A connection ring may be arranged outside the equipment butting device engagement portion or the cover butting device engagement portion, and the connection ring is provided with an internal thread. The connection ring is rotated so that the connection ring is moved to a junction between the equipment butting device engagement portion and the cover butting device engagement portion, to connect the equipment butting device engagement portion and the cover butting device engagement portion. The equipment butting device engagement portion may be connected to or disconnected from the cover butting device engagement portion by moving the connection ring. In the case of insertion, the equipment butting device engagement portion is provided with a recessed portion, and the shape of the recessed portion corresponds to the shape of the cover butting device engagement portion so that the cover butting device engagement portion can be inserted into the recessed portion, to connect the equipment butting device engagement portion and the cover butting device engagement portion. In other words, the cover butting device engagement portion is a vertical wall having a certain thickness, and the width and the shape of the recessed portion of the equipment butting device engagement portion correspond to the thickness and the shape of the vertical wall so that the vertical wall can be tightly inserted into the recessed portion, so as to achieve the insertion. In the case of snap connection, a snap member or a snap slot is provided on the inner surface of the equipment butting device engagement portion, and a snap slot or a snap member is provided on the outer surface of the cover butting device engagement portion. The snap member can be snapped into the snap slot to connect the equipment butting device engagement portion and the cover butting device engagement portion. The snap member may be a telescopic snap member, or may rotate relative to the snap slot, so as to achieve the engagement. The equipment butting device engagement portion may be connected with the cover butting device engagement portion in other manners than those described above.

The trigger mechanism of the equipment butting device and the opening switch mechanism of the cover butting device may be implemented by an ejector pin mechanism, a labyrinth mechanism, an electromagnetic mechanism or other mechanisms. In the case of an ejector pin mechanism, each of the first trigger mechanism and the second trigger mechanism includes a movable ejector block, and each of the first opening switch mechanism and the second opening switch mechanism includes an ejector pin, a stopper block, and a spring. The ejector block is used to push the ejector pin and the stopper block, to enable a fluid passage in the first opening switch mechanism and the first trigger mechanism and/or in the second opening switch mechanism and the second trigger mechanism. The spring is used to force the ejector pin and the stopper block to return, to cut off the fluid passage. The ejector block in each of the first trigger mechanism and the second trigger mechanism may be started manually or by a control device. The first trigger mechanism and the second trigger mechanism may be started separately or concurrently. Specifically, in each of the first opening switch mechanism and the second opening switch mechanism, the ejector pin is fixed to the stopper block, and the stopper block is fixed to the spring. The stopper block may abut on or move away from the boss portion in the bore of the opening switch mechanism, to open or close the bore of the opening switch mechanism. When the ejector block pushes the ejector pin, the ejector pin drives the stopper block to move away from the boss portion and further compress the spring, so as to enable the fluid passage. When the ejector block is retracted, the spring pushes the stopper block and the ejector pin to return and abut on the boss portion in the bore of the opening switch mechanism, so as to cut off the fluid passage. In the case of a labyrinth mechanism, each of the first trigger mechanism and the second trigger mechanism may include a rotatable trigger mechanism cylinder. The trigger mechanism cylinder is provided with a trigger mechanism channel and an insertion portion. Each of the first opening switch mechanism and the second opening switch mechanism may be provided with a rotatable opening switch mechanism cylinder and a fixed opening switch mechanism cylinder. The rotatable opening switch mechanism cylinder is provided with a first opening switch mechanism channel and an insertion hole, and the fixed opening switch mechanism cylinder is provided with a second opening switch mechanism channel. In a case that the insertion portion is inserted into the insertion hole, the trigger mechanism channel is in fluid communication with the first opening switch mechanism channel, and the rotatable opening switch mechanism cylinder is rotated by the trigger mechanism cylinder so that the trigger mechanism channel and the first opening switch mechanism channel are in fluid communication with the second opening switch mechanism channel to form the fluid passage, and the rotatable opening switch mechanism cylinder can be further rotated by the trigger mechanism cylinder so that the trigger mechanism channel and the first opening switch mechanism channel can be misaligned with the second opening switch mechanism channel to cut off the fluid passage.

In order to prevent the cover butting device from being reversely connected with the equipment butting device, which may result in potential safety hazard, the following reverse connection preventing methods are provided. The cover butting device is provided with a reverse connection preventing portion that is protruded or recessed. The protruded or recessed reverse connection preventing portion of the cover butting device is engaged with a recessed or protruded reverse connection preventing portion of the equipment butting device to prevent the first opening switch mechanism and the second opening switch mechanism from being reversely connected with the first trigger mechanism and the second trigger mechanism. Alternatively, the cover butting device is provided with a magnet, and the equipment butting device is provided with a magnet having the polarity opposite to the polarity of the magnet of the cover butting device at a corresponding position. The magnet of the cover butting device and the magnet of the equipment butting device attract each other to prevent the first opening switch mechanism and the second opening switch mechanism from being reversely connected with the first trigger mechanism and the second trigger mechanism. Alternatively, each of the cover butting device and the equipment butting device has a non-centrosymmetric shape. The non-centrosymmetric shape may include, for example, a triangular shape, a trapezoidal shape or a pentagonal shape, etc. The cover butting device having the non-centrosymmetric shape butts against the equipment butting device having the non-centrosymmetric shape to prevent the first opening switch mechanism and the second opening switch mechanism from being reversely connected with the first trigger mechanism and the second trigger mechanism. Alternatively, the first trigger mechanism and the second trigger mechanism of the equipment butting device have different sizes. The first trigger mechanism and the second trigger mechanism are respectively engaged with the first opening switch mechanism and the second opening switch mechanism that have different sizes, to prevent the first opening switch mechanism and the second opening switch mechanism from being reversely connected with the first trigger mechanism and the second trigger mechanism. Alternatively, the first trigger mechanism and the second trigger mechanism of the equipment butting device have different colors. The colors of the first trigger mechanism and the second trigger mechanism respectively correspond to the colors of the first opening switch mechanism and the second opening switch mechanism, to prevent the first opening switch mechanism and the second opening switch mechanism from being reversely connected with the first trigger mechanism and the second trigger mechanism.

The cover butting device may be further provided with a guide post, and the equipment butting device may be provided with a guide hole. The guide post is inserted into the guide hole, to locate the cover butting device and the equipment butting device and prevent relative rotation between the cover butting device engagement portion and the equipment butting device engagement portion. In addition, multiple pairs each including a guide post and a guide hole may be provided, and one or more of the multiple pairs have different shapes from other pairs, so as to achieve the reverse connection preventing while achieving the guiding.

The cover butting device may be further provided with a cover data transmission port. The cover data transmission port is connected to the monitoring device of the lithium slurry battery. The monitoring device arranged in the lithium slurry battery may detect data such as the liquid level of the electrolyte and pressure in the lithium slurry battery. The equipment butting device may be further provided with a device data transmission port. The device data transmission port is connected to the control device of the equipment butting device via a data line or in a wireless manner. In a case that the cover butting device butts against the equipment butting device, the cover data transmission port butts against the device data transmission port to transmit the data detected by the monitoring device to the control device, so as to control the liquid level, gas pressure and so on in the maintenance and regeneration process.

The lithium slurry battery may butt against the maintenance and regeneration equipment by performing the following steps (1) to (5). In step (1), the equipment butting device engagement portion of the equipment butting device of the maintenance and regeneration equipment is aligned with and hermetically connected with the cover butting device engagement portion of the cover butting device of the lithium slurry battery, and the first cover port and the second cover port of the cover butting device are respectively aligned with and hermetically connected with the first equipment port and the second equipment port of the equipment butting device. In step (2), the trigger mechanism of the equipment butting device is started manually or by a control device, to form a fluid passage in the trigger mechanism and the opening switch mechanism. In step (3), the fluid valves of the maintenance and regeneration equipment are controlled to perform the liquid replenishment, the liquid replacement, the gas injection or the gas discharge on the lithium slurry battery via the fluid passage, and the fluid valves of the maintenance and regeneration equipment are closed. In step (4), the trigger mechanism is reset to close the fluid passage in the trigger mechanism and the opening switch mechanism. In step (3), the equipment butting device is removed from the cover butting device.

A specific structure of the maintenance and regeneration equipment in the lithium slurry battery system is described in detail below. The maintenance and regeneration equipment may include a host and the equipment butting device. The gas storage tank, the liquid storage tank, the gas recovery storage tank, the liquid recovery storage tank, and corresponding fluid pipelines and control valves are arranged in a case of the host. The gas recovery storage tank of the maintenance and regeneration equipment is connected to the first equipment port via a first gas pipeline and a first header pipe, or is connected to the second equipment port via the first gas pipeline and a second header pipe. The gas storage tank of the maintenance and regeneration equipment is connected to the first equipment port via a second gas pipeline and the first header pipe. The liquid recovery storage tank of the maintenance and regeneration equipment is connected to the second equipment port via a first liquid pipeline and the second header pipe. The liquid storage tank of the maintenance and regeneration equipment is connected to the second equipment port via a second liquid pipeline and the second header pipe, or is connected to the first equipment port via the second liquid pipeline and the first header pipe. In other words, the first equipment port may be connected with one or more of the gas storage tank, the gas recovery storage tank and the liquid storage tank, to input gas or liquid to the lithium slurry battery or recovery gas from the lithium slurry battery via the first cover port. The second equipment port may be connected with one or more of the liquid storage tank, the liquid recovery storage tank and the gas recovery storage tank, to input liquid to the lithium slurry battery or recovery gas or liquid from the lithium slurry battery via the second cover port. The connection between the equipment port and the storage tank may be flexibly determined according to actual needs. The maintenance and regeneration equipment may further include a first gas control valve, a second gas control valve, a first liquid control valve and a second liquid control valve. The first gas control valve is arranged on the first gas pipeline and is configured to control gas in the lithium slurry battery to flow into the gas recovery storage tank via the first equipment port, the first header pipe and the first gas pipeline or via the second equipment port, the second header pipe and the first gas pipeline. The second gas control valve is arranged on the second gas pipeline and is configured to control gas in the gas storage tank to flow into the lithium slurry battery via the second gas pipeline, the first header pipe and the first equipment port. The first liquid control valve is arranged on the first liquid pipeline and is configured to control liquid in the lithium slurry battery to flow into the liquid recovery storage tank via the second equipment port, the second header pipe and the first liquid pipeline. The second liquid control valve is arranged on the second liquid pipeline and is configured to control liquid in the liquid storage tank to flow into the lithium slurry battery via the second liquid pipeline, the second header pipe and the second equipment port, or via the second liquid pipeline, the first header pipe and the first equipment port.

The gas storage tank, the liquid storage tank, the gas recovery storage tank and the liquid recovery storage tank of the maintenance and regeneration equipment may be made of a metal material or an insulating electrolyte-resistant material. The metal material may be stainless steel, aluminum, or the like. The insulating electrolyte-resistant material may be polytetrafluoroethylene, polypropylene, polyethylene, or the like. The gas storage tank stores dry gas. The dry gas may include at least one of nitrogen, air, noble gas and sulfur hexafluoride gas. Preferably, moisture content of the dry gas is less than or equal to 1 ppm. The first gas pipeline, the second gas pipeline, the first liquid pipeline, the second liquid pipeline, the first header pipe and the second header pipe may be rigid or flexible pipelines, which may be made of, for example, stainless steel, aluminum, polytetrafluoroethylene, polypropylene, polyethylene or the like. The first gas control valve, the second gas control valve, the first liquid control valve and the second liquid control valve may be flow control valves, preferably, one-way valves.

The liquid storage tank may be only an electrolyte storage tank. Alternatively, the liquid storage tank may include multiple storage tanks, for example, a first electrolyte storage tank, a cleaning liquid storage tank and a second electrolyte storage tank. The first electrolyte storage tank stores an electrolyte. The cleaning liquid storage tank stores a cleaning liquid. The second electrolyte storage tank stores an electrolyte containing an additive for stabilizing and repairing an SEI film. The first electrolyte storage tank, the cleaning liquid storage tank and the second electrolyte storage tank are respectively in communication with the second liquid pipeline via a switching valve or multiple liquid control valves. The electrolyte is a mixture of a lithium salt with a solvent. The lithium salt is lithium hexafluorophosphate. The solvent may be ethylene carbonate (EC), diethyl carbonate (DEC), dimethyl carbonate (DMC), ethyl methyl carbonate (EMC), or the like. The cleaning liquid may be esters, carbonic ester derivatives, ethers or ketones. Specifically, the ester solvent includes ethylene carbonate, propylene carbonate, dimethyl carbonate, diethyl carbonate, ethyl methyl carbonate, methyl propyl carbonate, methyl formate, ethyl formate, methyl acetate, ethyl acetate, propyl acetate, ethyl propionate, methyl butyrate, ethyl butyrate, ethylene sulfite, propylene sulfite, trimethyl phosphate, triethyl phosphate, tributyl phosphate, and the like. The carbonic ester derivative solvent includes chloroethylene carbonate, fluoroethylene carbonate, difluoro propylene carbonate, trifluoro propylene carbonate, and the like. The ether solvent includes dimethoxymethane, 1,2-dimethoxyethane, tetrahydrofuran, dimethyl tetrahydrofuran, diethylene glycol dimethyl ether, 4-Methyl-1,3-dioxolane, and the like. The ketone solvent includes acetone and the like. The additive for stabilizing and repairing an SEI film may include at least one of: a sulfinyl additive such as ethylene sulfite, propylene sulfite, dimethyl sulfite, diethyl sulfite, dimethyl sulfoxide and so on; a sulfonate ester additive such as 1,3-propane sultone, 1,4-butane sultone, ethyl methyl sulfonate, butyl methyl sulfonate and so on; vinylene carbonate; anisole or halogenated derivative thereof; a halogenated organic such as halogenated EC, trifluoroethyl phosphonic acid, methyl chloroformate, bromo-butyrolactone, fluoroacetoxy ethane and so on; and an inorganic additive such as sulfur dioxide, carbon dioxide, lithium carbonate and so on. The additive mentioned above is mixed in the electrolyte, where the content of the additive in the electrolyte is 0.1% to 5%. In addition, the liquid storage tank may further include a storage tank for storing a reactive breaker for an SEI film. The reactive destroyer for an SEI film may be a protic solvent containing active hydrogen, such as acids, alcohols, amines and so on.

The maintenance and regeneration equipment may include a vacuum device. The vacuum device is arranged on the first gas pipeline and is configured to vacuumize the lithium slurry battery via the first equipment port or the second equipment port. In a case that the first gas control valve is opened manually or by a control device, the gas in the lithium slurry battery may be pumped by the vacuum device into the gas recovery storage tank via the first cover port of the lithium slurry battery and the first equipment port of the maintenance and regeneration equipment or via the second cover port of the lithium slurry battery and the second equipment port of the maintenance and regeneration equipment. The maintenance and regeneration equipment may further include a first liquid pump. The first liquid pump is arranged on the first liquid pipeline and is configured to suction the liquid in the lithium slurry battery via the second equipment port. In a case that the first liquid control valve is opened manually or by a control device, the liquid in the lithium slurry battery may be pumped by the first liquid pump into the liquid recovery storage tank via the second cover port of the lithium slurry battery and the second equipment port of the maintenance and regeneration equipment.

The maintenance and regeneration equipment may include a gas-driving device. The gas-driving device is arranged on the second gas pipeline and is connected to the liquid storage tank via a gas-driving pipeline. The gas-driving device may be configured to drive the gas in the gas storage tank to flow into the lithium slurry battery via the first equipment port and the first cover port of the lithium slurry battery. The gas-driving device may be further configured to drive the gas in the gas storage tank to flow into the liquid storage tank and further drive the liquid in the liquid storage tank to flow into the lithium slurry battery via the second equipment port and the second cover port of the lithium slurry battery or via the first equipment port and the first cover port of the lithium slurry battery. In a case that the second gas control valve is opened manually or by a control device, the gas in the gas storage tank may be pumped by using the gas-driving device into the lithium slurry battery via the first equipment port and the first cover port of the lithium slurry battery. In s case that the second liquid control valve and a control valve on the gas-driving pipeline are opened manually or by a control device, the gas in the gas storage tank may be pumped by using the gas-driving device into the liquid storage tank, and the liquid in the liquid storage tank may be further pushed by the gas into the lithium slurry battery via the second equipment port and the second cover port of the lithium slurry battery or via the first equipment port and the first cover port of the lithium slurry battery. That is, the gas-driving device may be used to pump not only the gas in the gas storage tank but also the liquid in the liquid storage tank. In another embodiment, the maintenance and regeneration equipment includes a gas-driving device and a second liquid pump. The gas-driving device is arranged on the second gas pipeline. The gas-driving device may be configured to drive the gas in the gas storage tank to flow into the lithium slurry battery via the first equipment port and the first cover port of the lithium slurry battery. The second liquid pump is arranged on the second liquid pipeline. The second liquid pump may be configured to drive the liquid in the liquid storage tank to flow into the lithium slurry battery via the second equipment port and the second cover port of the lithium slurry battery or via the first equipment port and the first cover port of the lithium slurry battery. In a case that the second gas control valve is opened manually or by a control device, the gas in the gas storage tank may be pumped by using the gas-driving device into the lithium slurry battery via the first equipment port and the first cover port of the lithium slurry battery. In s case that the second liquid control valve is opened manually or by a control device, the liquid in the liquid storage tank may be pumped by using the second liquid pump into the lithium slurry battery via the second equipment port and the second cover port of the lithium slurry battery or via the first equipment port and the first cover port of the lithium slurry battery. That is, the gas in the gas storage tank and the liquid in the liquid tank are respectively pumped by the gas-driving device and the second liquid pump.

The maintenance and regeneration equipment may further include a third gas pipeline. The third gas pipeline and the first header pipe connect the first equipment port to the gas recovery storage tank. A third gas control valve may be arranged on the third gas pipeline. In a case that a gas pressure in the lithium slurry battery is greater than a preset gas pressure, the gas in the lithium slurry battery may flow into the gas recovery storage tank via the first equipment port, the first header pipe, the third gas pipeline and the third gas control valve or via the second equipment port, the second header pipe, the third gas pipeline and the third gas control valve. The third gas control valve may be a vent valve, and is automatically opened and closed under a gas pressure in the third gas pipeline. Alternatively, the third gas control valve may be an electronic control valve, and is opened and closed manually or by a control device based on a detected gas pressure in the third gas pipeline. In addition, in a case that the third gas pipeline is not provided, the gas in the lithium slurry battery exceeding the preset gas pressure may flow into the gas recovery storage tank via the first gas pipeline and the first gas control valve. During the use of the lithium slurry battery, the gas pressure in the lithium slurry battery may rise due to overcharge or overdischarge of the lithium slurry battery and volatilization of the electrolyte. By timely discharging the gas in the lithium slurry battery, risks such as explosion of the lithium slurry battery due to an excessive inner gas pressure can be effectively avoided. The preset gas pressure in the lithium slurry battery may be determined according to actual conditions, for example, may be 0.15 MPa to 0.5 MPa.

A gas pressure gauge may be arranged in the first header pipe and/or the second header pipe to detect a gas pressure in the first header pipe and/or the second header pipe. For example, one end of the first header pipe is connected to the first equipment port, and the other end of the first header pipe is connected with the first gas pipeline, the second gas pipeline and the third gas pipeline via a four-way union. A liquid pressure gauge may be arranged in the first header pipe and/or the second header pipe to detect a liquid pressure in the first header pipe and/or the second header pipe. For example, one end of the second header pipe is connected to the second equipment port, and the other end of the second header pipe is connected with the first liquid pipeline and the second liquid pipeline via a three-way union.

The maintenance and regeneration equipment may further include a vibration and heating device. The vibration and heating device is configured to vibrate and heat the lithium slurry battery, to clean the lithium slurry battery or remove SE film. During the long-time use of the lithium slurry battery, a generated side reaction causes the electrolyte to gradually fail, and an SEI film generated on a surface of an electrode active material or even a current collector due to the side reaction is gradually thickened, which results in increased internal resistance and reduced cycle life of the lithium slurry battery. In order to break the SEI film, processes such as high-temperature processing and ultrasonic heating may be performed by the vibration and heating device on the lithium slurry battery, to remove the SE film. In addition, in the liquid replacement of the lithium slurry battery, the lithium slurry battery is cleaned by performing vacuumizing, liquid injection and liquid discharge for multiple times. In order to thoroughly clean the lithium slurry battery, the lithium slurry battery may be vibrated and heated by the vibration and heating device during the cleaning.

The maintenance and regeneration equipment may further include a weighing device. The weighing device may be configured to weight the lithium slurry battery before the liquid injection and after the liquid injection, to accurately obtain an amount of injected liquid in the lithium slurry battery. In addition, the maintenance and regeneration equipment may also accurately determine the amount of injected liquid by controlling the amount of the injected liquid or by performing detection by a sensor, or the like.

The maintenance and regeneration equipment may further include a formation device. A positive connector and a negative connector of the formation device are respectively electrically connected to a positive terminal and a negative terminal of the lithium slurry battery to charge and discharge the lithium slurry battery. By the formation device, the lithium slurry battery may be sufficiently discharged before the liquid replacement. In addition, by the formation device, the SET film may be removed from the lithium slurry battery by, for example, repeated charge and discharge at a high temperature, charge and discharge at a large current, overcharge and overdischarge at a high potential and so on.

The maintenance and regeneration equipment may further include a control device. The control device may control opening and closing of the first gas control valve, the second gas control valve, the third gas control valve, the first liquid control valve, the second liquid control valve, the vacuum device, the gas-driving device, the first liquid pump, the second liquid pump, the vibration and heating device, the formation device and the monitoring device. Further, as described above, the control device may control the liquid level and the gas pressure in the lithium slurry battery by using the maintenance and regeneration equipment based on the detected data fed back by the monitoring device of the lithium slurry battery. In addition, the maintenance and regeneration equipment may be provided with a control panel, by which operations on the control device and manual operations on the valves and devices may be performed.

The lithium slurry battery may have a conventional structure of lithium slurry battery in which, for example, a cell core of the lithium slurry battery is arranged in a case of the lithium slurry battery. In the present disclosure, a discharging device is provided in the lithium slurry battery, so as to facilitate the liquid replacement of the lithium slurry battery. The discharging device includes a seepage support portion and a suction portion. The cell core is arranged on the seepage support portion, and a peripheral sidewall of the cell core is hermetically connected to the seepage support portion. The seepage support portion is provided with a seepage space and a discharging passage in fluid communication with the seepage space. The discharging passage is in fluid communication with one end of the suction portion, and the other end of the suction portion is connected to the second cover port of the cover. Fluid in the cell core seeps downwards into the seepage space of the seepage support portion, and a suction process is performed at the second cover port of the cover to discharge the fluid in the seepage space of the seepage support portion from the lithium slurry battery via the discharging passage, the suction portion and the second cover port. The seepage support portion not only supports the cell core, but also seeps the fluid. That is, the seepage support portion may be in a plate shape, a block shape, a box shape or a combination thereof, at least an edge portion of the seepage support portion can support the cell core. Further, a center portion of the seepage support portion may support the cell core by a rib, a projection or the like. The seepage space of the seepage support portion may be a recess, a hole, a cavity or the like. The fluid in the seepage space of the seepage support portion may be discharged via the discharging passage on the seepage support portion. One end of the suction portion is in fluid communication with the discharging passage, and the other end of the suction portion is in fluid communication with the second cover port of the cover. The fluid flowing from the discharging passage of the seepage support portion may be suctioned from the second cover port of the cover by a suction device via the suction portion. The number of the discharging passage may be one or more.

The hermetical connection between the peripheral sidewall of the cell core and the seepage support portion plays an important role in defining an optimal flow path via which fluid flows downwards from the cell core. A fluid passage outside the cell core—for example, the surrounding of the cell core and a gap between the cell core and the seepage support portion—are cut off, such that the fluid in the cell core can be thoroughly discharged, and thus the liquid in the cell core of the lithium slurry battery can be sufficiently replaced. The seepage support portion may be hermetically connected to the peripheral sidewall of the cell core by using a sealing glue, a sealing strip, a sealing ring, or the like. The sealing glue may be a polytetrafluoroethylene adhesive, a high-performance instant glue, a normal-temperature solidified polytetrafluoroethylene glue, or the like. In addition, the seepage support portion may also be hermetically connected to the peripheral sidewall of the cell core by hot-gas welding, hot-press welding or the like. A part of the seepage support portion hermetically connected with the cell core may be determined depending on a specific structure of the seepage support portion. In a case that all or a part of a top surface of the seepage support portion is planar, a part of the peripheral sidewall of the cell core adjacent to a bottom of the cell core may be hermetically connected to the planar part of the top surface of the seepage support portion. In a case that the seepage support portion is provided with a vertical sidewall surrounding the cell core and having a height equal to or less than a height of the cell core, an upper end portion, multiple parts or all of the vertical sidewall may be hermetically connected to the peripheral sidewall of the cell core. In a case that the seepage support portion is provided with a recess having a size corresponding to the cell core to accommodate the cell core, a sidewall of the recess may be hermetically connected to the peripheral sidewall of the cell core.

Specific structures of the seepage support portion in different embodiments are described below. A main body of the seepage support portion may be for example, a support plate, a guide plate, or a base.

The seepage support portion may be a support plate. The support plate may be provided with a guide groove. The guide groove is in fluid communication with the discharging passage on a sidewall of the support plate. The guide groove herein functions as the seepage space of the seepage support portion. The guide groove may be linear or may have a continuously-curved shape, for example, an S shape, a wave shape, or a zig-zag shape. The number of the guide groove may be one or more, and at least one end of each guide groove is in fluid communication with the discharging passage.

The seepage support portion may be provided with a guide plate having a height of h. The guide plate is provided with multiple inclined grooves. The depth of each inclined groove is increasing sequentially from zero and equal to or less than the height h of the guide plate. The guide plate differs from the support plate in that the guide plate has a function of guiding the fluid, which may be achieved by the inclined grooves on the guide plate. The fluid may be entirely guided to one end of the guide plate by the inclined grooves, and then is discharged. In this case, the inclined grooves may function as a discharging passage, and no additional discharging passage is required to be arranged on a sidewall of the guide plate. Further, the inclined grooves may also function as the seepage space.

The seepage support portion may be provided with a guide plate having a height of h. A top surface of the guide plate is an inclined surface converging at a convergence point. Preferably, the convergence point is located on an edge of the guide plate at a height lower than the height h of the guide plate. For example, the inclined surface may be a part of a conical surface, and a vertex of the conical surface serves as the convergence point. Alternatively, the inclined surface may be formed by multiple triangular inclined surfaces. Triangles of the multiple triangular inclined surfaces have a common vertex as the convergence point. A space above the inclined surface may function as not only the seepage space but also the discharging passage.

The seepage support portion may include only the guide plate. In a case that the guide plate cannot stably support the cell core due to excessive inclined grooves or a large inclined surface, the seepage support portion may be further provided with a seepage plate. The seepage plate may be arranged on the guide plate and is fixed to the guide plate. The seepage plate may be provided with multiple through holes. The liquid in the cell core may flow to the guide plate via the through holes of the seepage plate and further flows into the suction portion under guide of the guide plate. With the seepage plate, the cell core can be stably supported, and the liquid in the cell core can flow downwards via the seepage plate. In a case that the seepage support portion is provided with the guide plate and the seepage plate on the guide plate, the peripheral sidewall of the cell core is hermetically connected to the seepage plate, and a peripheral edge of the seepage plate is hermetically connected to a peripheral edge of the guide plate.

The seepage support portion may be a base. The base includes a base sidewall protruding from a peripheral edge of the base, a support table located inside the base sidewall, and a guide cavity (a seepage space) located in the middle of the base. Preferably, a center portion of a bottom surface of the guide cavity is higher than an edge portion of the bottom surface and is lower than the support table. Further, the bottom surface of the guide cavity may have a structure corresponding to one or a combination of structures of the top surface of the guide plate. The cell core may be hermetically connected to the support table. Fluid in the guide cavity may be discharged via the discharging passage in the support table and the base sidewall.

The suction portion may be, for example, a flexible pipe, a rigid pipe, or a passage that is integrally formed with the case or an independent plate. A specific structure of the suction portion is related to a structure of the discharging passage of the seepage support portion. In a case that the discharging passage is provided with a hole or a convergence point, or the discharging passage is tubular, one end of the suction portion or the whole suction portion may be implemented by a flexible pipe, a rigid pipe or a tubular passage corresponding to the discharging passage. In a case that the discharging passage is relatively wide (for example, the discharging passage is elongated, or the discharging passage is provided with multiple grooves, or the discharging passage is provided with multiple holes arranged in one row), one end (for example, is implemented by an elongated opening) of the suction portion may be in fluid communication with the whole discharging passage.

The suction portion may include a vertical suction portion and a horizontal suction portion. The vertical suction portion may be a vertical suction box having a trapezoidal shape, and the horizontal suction portion may be a horizontal suction box having a rectangle shape. Both the vertical suction box and the horizontal suction box are hollow boxes. A lower end portion of the vertical suction box is connected to and in fluid communication with the discharging passage of the seepage support portion. One end of the horizontal suction box is connected to a top end portion of the vertical suction box, and an opening at the other end of the horizontal suction box is connected to the second cover port of the cover. Alternatively, the vertical suction portion is a vertical wall provided with, for example, a tubular vertical passage, and the horizontal suction portion is a horizontal strip provided with, for example, a tubular horizontal passage or a grooved horizontal passage. A lower end portion of the vertical passage in the vertical wall is connected to and in fluid communication with the discharging passage of the seepage support portion. One end of the horizontal passage of the horizontal strip is in fluid communication with the vertical passage of the vertical wall, and the other end of the horizontal passage of the horizontal strip is in fluid communication with the second cover port of the cover.

The present disclosure has the following advantages.

1) The lithium slurry battery system provided in the present disclosure has functions of performing liquid injection, liquid replenishment, liquid replacement, gas injection, gas discharge and formation on the lithium slurry battery. Various function modules are designed in a modular and integrated manner, facilitating one-stop maintenance and regeneration for the lithium slurry battery. Further, the targeted maintenance and the regeneration can be flexibly performed on the lithium slurry battery according to requirements of the lithium slurry battery.

2) The lithium slurry battery system provided in the present disclosure has a flexible operation mode and a high automation degree. The maintenance and the regeneration on the lithium slurry battery may be performed on the application site. For example, the maintenance and the regeneration may be performed by the maintenance and regeneration equipment on a lithium slurry battery of an electric vehicle without disassembling the battery. Further, the maintenance and regeneration equipment may be placed at a maintenance and regeneration station to perform the maintenance and the regeneration on a lithium slurry battery.

3) The maintenance and regeneration equipment in the lithium slurry battery system can be rapidly and accurately connected to or disconnected from a to-be-maintained lithium slurry battery with the cover butting device and the equipment butting device, which requires a simple operation, has a high operation efficiency, occupies less space, and requires low cost.

4) Multiple fluid passages of the cover butting device can be opened or closed independently, to flexibly perform the targeted maintenance and regeneration on the lithium slurry battery according to the requirements of the lithium slurry battery, so that the butting devices in the lithium slurry battery system have high flexibility.

5) Multiple sealing arrangements between the fluid passage and the outside ensure sealing property and operation security during the maintenance and regeneration.

6) The flow path of the electrolyte is defined to force the electrolyte to flow out via the cell core, such that the cell core is thoroughly emptied so as to be wetted by a new liquid during the liquid replacement, thereby significantly increasing a replacement rate of the electrolyte in the cell core, and improving the liquid replacement effect.

7) The seepage space of the seepage support portion can collect electric-conductive electrode particles leaked from the electrode piece, thereby effectively avoiding a short circuit due to leakage of the electric-conductive electrode particles of the electrode piece.

BRIEF DESCRIPTION OF THE DRAWINGS

FIG. 4 is a partial sectional view showing butting devices for a lithium slurry battery and a maintenance and regeneration equipment according to an embodiment of the present disclosure, where

FIG. 5 is a partial sectional view showing butting devices for a lithium slurry battery and a maintenance and regeneration equipment according to another embodiment of the present disclosure, where

Figure 1:
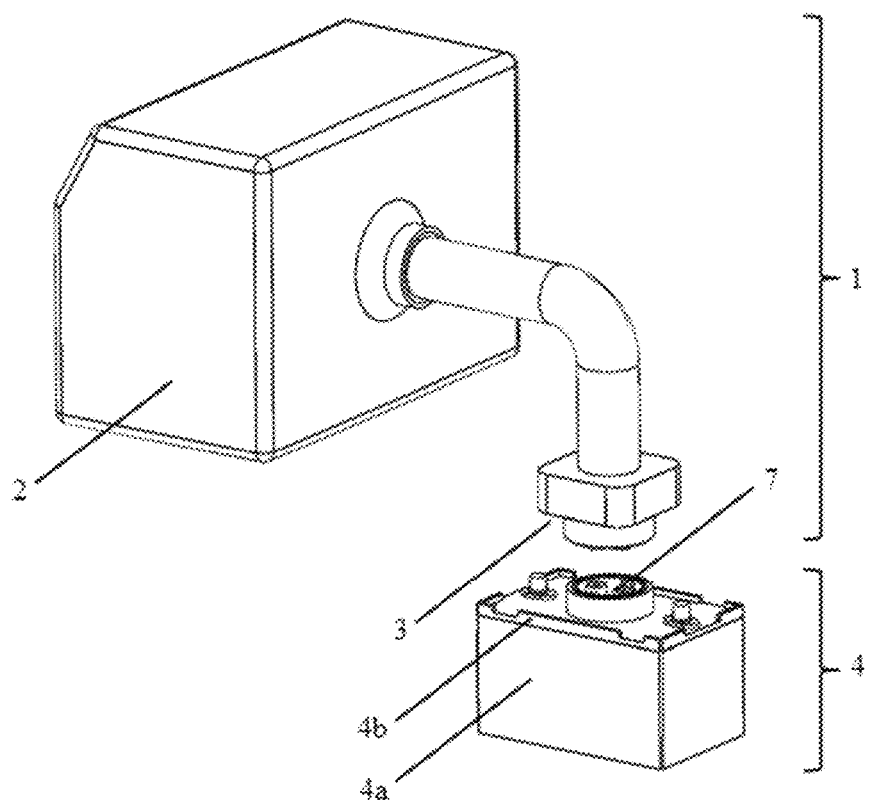
FIG. 1 is a schematic diagram showing a lithium slurry battery system provided in the present disclosure.

| Reference Numerals in FIGS.: | | | |
|---|---|---|---|
| 1 | maintenance and regeneration equipment, | 101 | gas pressure gauge, |
| 102 | liquid pressure gauge, | 103 | control device, |
| 105 | gas recovery storage tank, | 106 | gas storage tank, |
| 107 | liquid recovery storage tank, | 108 | liquid storage tank, |
| 109 | first header pipe, | 110 | first gas pipeline, |
| 111 | first gas control valve, | 112 | vacuum device, |
| 113 | second gas pipeline, | 114 | second gas control valve, |
| 115 | gas-driving device, | 116 | third gas pipeline, |
| 117 | third gas control valve, | 118 | second header pipe, |
| 119 | first liquid pipeline, | 120 | first liquid control valve, |
| 121 | first liquid pump, | 122 | second liquid pipeline, |
| 123 | second liquid control valve, | 124 | second liquid pump, |
| 125 | gas-driving pipeline, | 2 | host, |
| 3 | equipment butting device, | 3A | first equipment port, |
| 3B | second equipment port, | 301a | first mounting hole, |
| 301b | second mounting hole, | 302a | first trigger mechanism, |
| 302b | second trigger mechanism, | | |
| 303 | equipment butting device engagement portion, | | |
| 304 | connection ring, | 305 | stepped hole, |
| 306 | ejector block, | 307 | inner insertion wall, |
| 308 | second groove, | 309 | engagement hole, |
| 310 | snap member, | 311 | trigger mechanism cylinder, |
| 312 | trigger mechanism channel, | 313 | insertion portion, |
| 314 | guide hole, | 4 | lithium slurry battery, |
| 4a | case body, | 4b | cover, |
| 5a | seepage support portion, | 501 | discharging passage, |
| 502 | seepage space, | 503 | guide plate, |
| 504 | seepage plate, | 505 | through hole, |
| 506 | inclined groove, | 507 | base sidewall, |
| 508 | support table, | 509 | guide cavity, |
| 510 | vertical sidewall, | 5b | suction portion, |
| 511 | suction passage, | 512 | vertical suction portion, |
| 513 | horizontal suction portion, | 514 | tubular vertical passage, |
| 515 | grooved horizontal passage, | 6 | sealing portion, |
| 7 | cover butting device, | 7A | first cover port, |
| 7B | second cover port, | 701a | first opening, |
| 701b | second opening, | | |
| 702a | first opening switch mechanism, | | |
| 702b | second opening switch mechanism, | | |
| 703 | cover butting device engagement portion, | | |
| 704 | first groove, | 705 | ejector pin, |
| 706 | boss portion, | 707 | stopper block, |
| 708 | spring, | 709 | outer insertion wall, |
| 710 | rotatable opening switch mechanism cylinder, | | |
| 711 | fixed opening switch mechanism cylinder, | | |
| 712 | first opening switch mechanism channel, | | |
| 713 | insertion hole, | | |
| 714 | second opening switch mechanism channel, | | |
| 715 | cover data transmission port, | 716 | guide post, |
| 717 | snap slot, | 8 | cavity, |
| 9 | cell core. | | |

DETAILED DESCRIPTION OF EMBODIMENTS

The present disclosure is described in detail below with reference to embodiments and the drawings.

FIG. 1 is a schematic diagram showing a lithium slurry battery system provided in the present disclosure. A maintenance and regeneration equipment 1 includes a host 2, and an equipment butting device 3. The equipment butting device 3 is connected to a liquid storage tank, a gas storage tank, a liquid recovery storage tank and a gas recovery storage tank in the host 2 via fluid pipelines. A fluid valve may be used to control fluid circulation, a flow direction, a flow speed, and the like, of the fluid. A control device and an operation interface for the equipment butting device 3 may be directly arranged on the equipment butting device 3 or may also be arranged on the host 2. A lithium slurry battery 4 includes a cell core, a case body 4a, and a cover 4b. A cover butting device 7 is arranged on the cover 4b. The equipment butting device 3 may rapidly butt against the cover butting device 7 or may be rapidly separated from the cover butting device 7, to achieve online maintenance and regeneration for the lithium slurry battery in the lithium slurry battery system.

Figure 2:
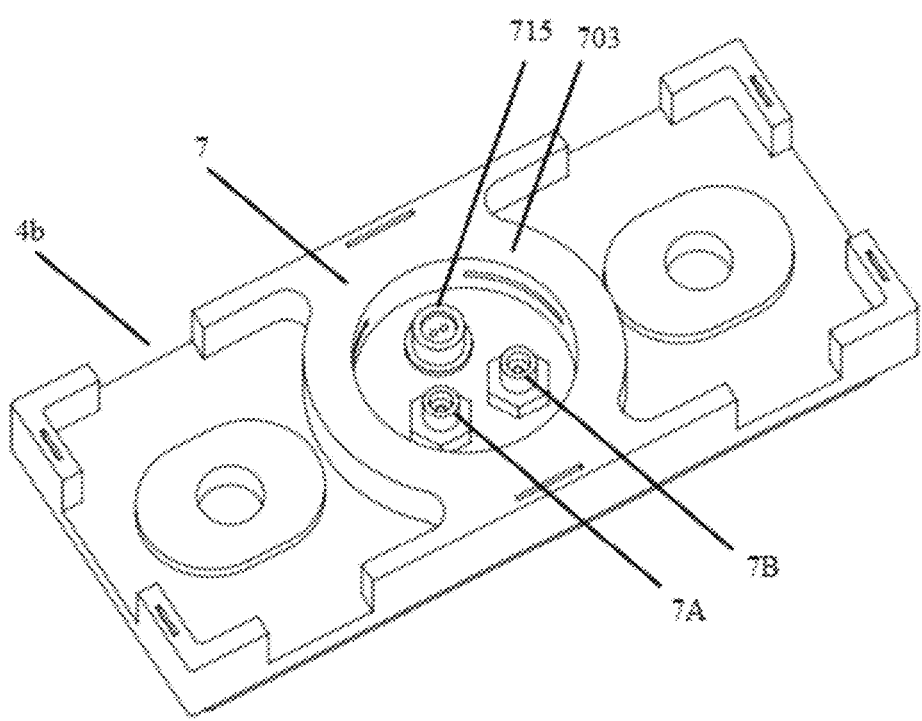
FIG. 2 is a schematic diagram showing a cover of a lithium slurry battery according to an embodiment of the present disclosure.

FIG. 2 is a schematic diagram showing a cover of a lithium slurry battery according to an embodiment of the present disclosure. The cover butting device 7 is arranged on the cover 4b of the lithium slurry battery. The cover butting device 7 includes a cover butting device engagement portion 703, a first cover port 7A, a second cover port 71, and a cover data transmission port 715. The cover butting device engagement portion 703 is a continuous outer wall. The outer wall extends upwards from a top surface of the cover 4b and continuously surrounds the first cover port 7A, the second cover port 7B, and the cover data transmission port 715, to form a cavity so as to accommodate the first cover port 7A, the second cover port 7B, and the cover data transmission port 715. The cover data transmission port 715 is connected to a monitoring device in the lithium slurry battery to transmit data detected by the monitoring device.

Figure 3A:
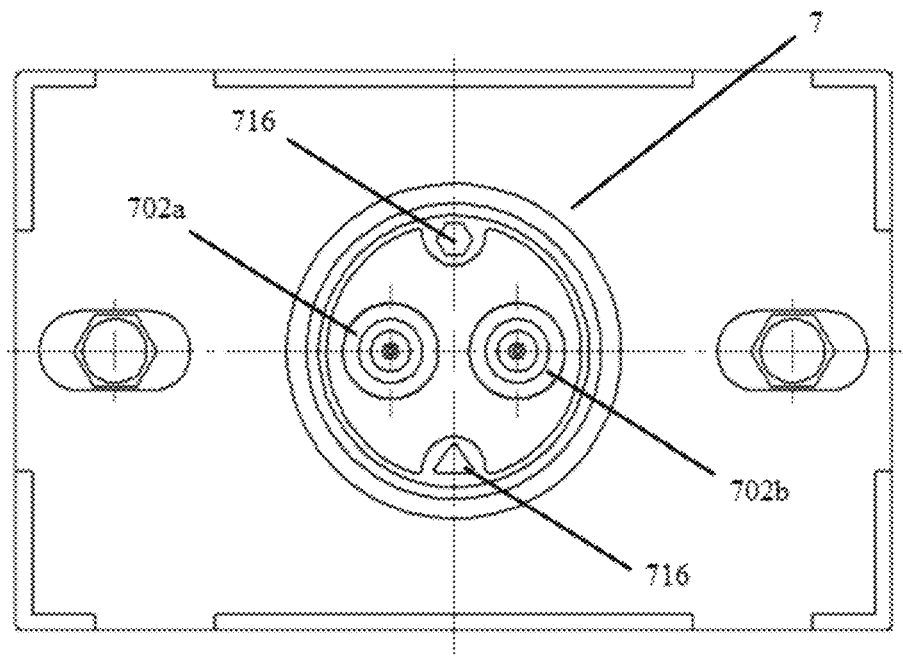
FIG. 3 is a schematic plan view showing a reverse connection preventing structure for an equipment butting device and a cover butting device according to an embodiment of the present disclosure, where FIG. 3(*a*) and FIG. 3(*b*) respectively show the cover butting device and the equipment butting device.
Figure 3B:
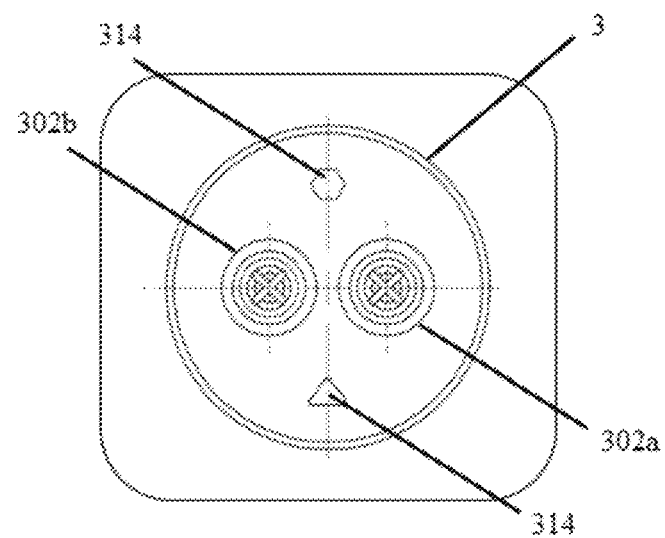

FIG. 3 is a schematic plan view showing a reverse connection preventing structure for an equipment butting device and a cover butting device according to an embodiment of the present disclosure, where FIG. 3(a) shows a top view of the cover butting device, and FIG. 3(b) shows a bottom view of the equipment butting device. The cover butting device 7 includes two guide posts 716. One of the two guide posts has a hexagonal cross section, and the other of the two guide posts has a triangular cross section. The equipment butting device 3 includes two guide holes 314. One of the two guide holes has a hexagonal cross section, and the other of the two guide holes has a triangular cross section. In a case that the guide post having the hexagonal cross section is aligned with the guide hole having the hexagonal cross section and the guide post having the triangular cross section is aligned with the guide hole having the triangular cross section, the equipment butting device 3 can rapidly butt against the cover butting device 7, and the first trigger mechanism 302a and the second trigger mechanism 302b of the equipment butting device can be prevented from being reversely connected with the first opening switch mechanism 702a and the second opening switch mechanism 702b of the cover butting device.

Figure 4A:
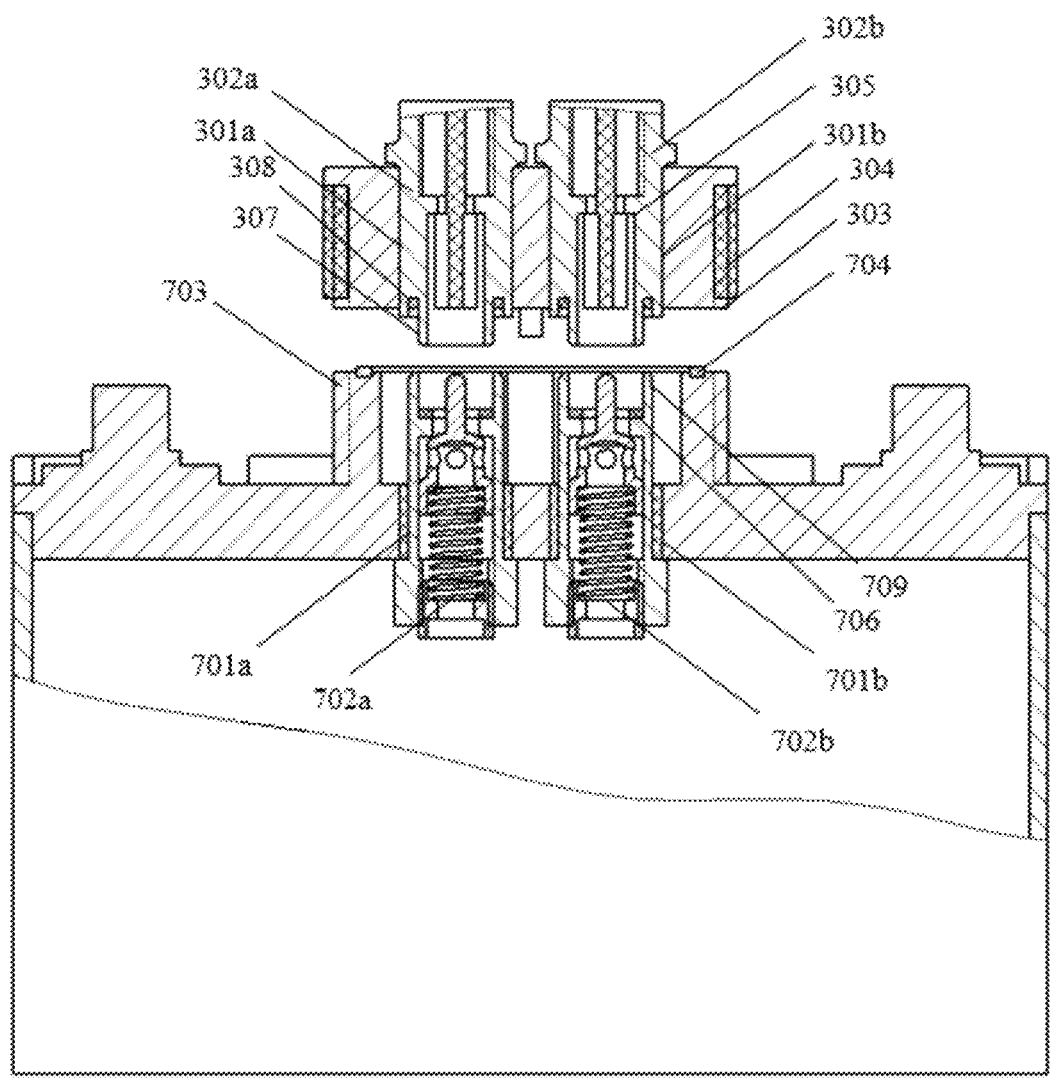
FIG. 4(a) shows a state in which an equipment butting device is separated from a cover butting device.
Figure 4B:
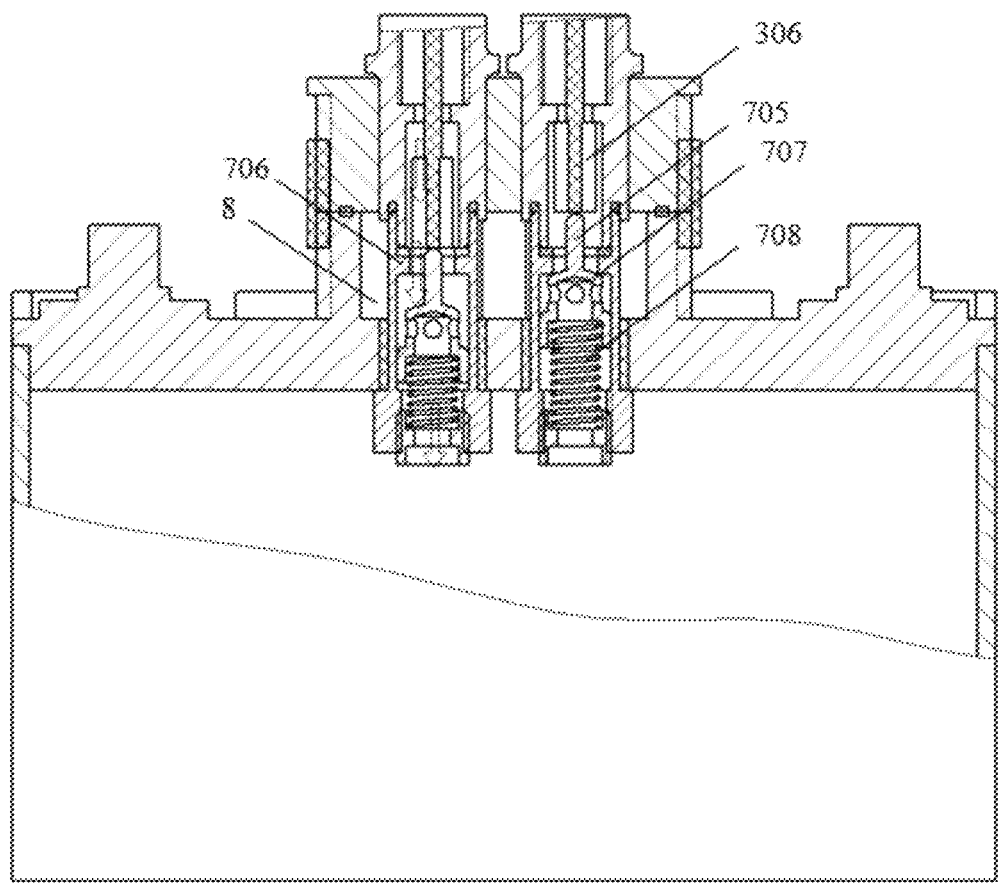
FIG. 4(b) shows a state in which the equipment butting device butts against the cover butting device.

FIG. 4 is a partial sectional view showing butting devices for a lithium slurry battery and a maintenance and regeneration equipment according to an embodiment of the present disclosure. FIG. 4(a) shows a state in which an equipment butting device is separated from a cover butting device. FIG. 4(b) shows a state in which the equipment butting device butts against the cover butting device, where a left portion shows that the first trigger mechanism actuates the first opening switch mechanism and a fluid passage (which is denoted by an arrow shown in FIG. 4(b)) is enabled, and a right portion shows that the second trigger mechanism does not actuate the second opening switch mechanism and the fluid passage is closed. The equipment butting device includes a first mounting hole 301a, a second mounting hole 301b, the first trigger mechanism 302a, the second trigger mechanism 302b, and an equipment butting device engagement portion 303. The first trigger mechanism 302a and the second trigger mechanism 302b are respectively slidably arranged in the first mounting hole 301a and the second mounting hole 301b. In the equipment butting device, the equipment butting device engagement portion 303 includes: a cylinder surrounding the first trigger mechanism 302a and the second trigger mechanism 302b, and a connection ring 304 sleeved on the cylinder. The cylinder is provided with an external thread, and the connection ring 304 is provided with an internal thread. Each of the first trigger mechanism 302a and the second trigger mechanism 302b includes a stepped hole 305 and an ejector block 306 that is slidable in the stepped hole. The ejector block 306 may be controlled manually or by a control device to move in the stepped hole 305. The stepped hole 305 may limit the ejector block 306. Each of the first trigger mechanism 302a and the second trigger mechanism 302b is further provided with an inner insertion wall 307 and a second groove 308 surrounding the inner insertion wall 307. A second sealing member is arranged in the second groove 308. The cover butting device includes a first opening 701a, a second opening 701b, the first opening switch mechanism 702a, the second opening switch mechanism 702b, and the cover butting device engagement portion 703. The first opening 701a, the second opening 701b, and the cover butting device engagement portion 703 are integrally formed with the cover of the lithium slurry battery. Fixed portions of the first opening switch mechanism 702a and the second opening switch mechanism 702b are respectively hermetically fixed in the first opening 701a and the second opening 701b. In the cover butting device, the cover butting device engagement portion 703 is a cylinder surrounding the first opening switch mechanism 702a and the second opening switch mechanism 702b. The cover butting device engagement portion 703 is provided with an external thread. A first groove 704 and a first sealing member are arranged on a top surface of the cover butting device engagement portion. Each of the first opening switch mechanism 702a and the second opening switch mechanism 702b is provided with an ejector pin 705, a bore, a boss portion 706, a stopper block 707, and a spring 708. The stopper block 707 is integrally formed with the ejector pin 705 and is fixed to the spring 708. Under the thrust of spring 28, the stopper block 707 may abut against the boss portion 706 to seal the fluid passage. Each of the first opening switch mechanism 702a and the second opening switch mechanism 702b may be further provided with an outer insertion wall 709. Further, a third sealing member may be arranged on a top surface of the boss portion 706 in the bore.

A butting process between the butting devices is described below with reference to FIG. 4. Firstly, the equipment butting device butts against the cover butting device. The guide holes of the equipment butting device and the guide posts of the cover butting device are accurately positioned, such that the two trigger mechanisms of the equipment butting device are respectively aligned with the two opening switch mechanisms of the cover butting device, and the equipment butting device engagement portion 303 is aligned with the cover butting device engagement portion 703. Then, the connection ring 304 is moved to a junction between the equipment butting device engagement portion 303 and the cover butting device engagement portion 703, such that the equipment butting device engagement portion 303 is hermetically connected with the cover butting device engagement portion 703. A cavity 8 formed by the equipment butting device engagement portion 303 and the cover butting device engagement portion 703 is vacuumized by a vacuum device in the maintenance and regeneration equipment via the stepped hole in the trigger mechanism of the equipment butting device. Then, the trigger mechanism is controlled by the control device to slide downwards to be hermetically connected with the corresponding opening switch mechanism. A first sealing arrangement is formed between the cover butting device engagement portion and the equipment butting device engagement portion by using the first sealing member arranged in the first groove 704 of the cover butting device engagement portion 703. A second sealing arrangement is formed between the second groove 308 of the trigger mechanism and the outer insertion wall 709 of the opening switch mechanism by using the second sealing member arranged in the second groove 308 of the trigger mechanism. A third sealing arrangement is formed between the inner insertion wall 307 of the trigger mechanism and the boss portion 706 of the opening switch mechanism by using the third sealing member arranged on the boss portion 706 of the opening switch mechanism. The ejector block 306 in the first trigger mechanism 302a is actuated to push the ejector pin 705 and the stopper block 707 in the first opening switch mechanism 702a, so as to push the stopper block 707 away from the boss portion 706, such that a fluid passage for fluid circulation is formed between the stepped hole 305 in the first trigger mechanism 302a and the bore in the first opening switch mechanism 702a. After the maintenance and regeneration process is completed, the ejector block 306 in the first trigger mechanism 302a is withdrawn, so that the ejector pin 705 and the stopper block 707 in the first opening switch mechanism 702a are returned under effect of the compressed spring 708, and the stopper block 707 abuts against the boss portion 706, so as to seal the bore of the first opening switch mechanism and further cut off the fluid passage between the stepped hole 305 in the first trigger mechanism 302a and the bore in the first opening switch mechanism 702a. Then, the connection ring 304 is moved back, and the equipment butting device is removed from the cover butting device.

Figure 5A:
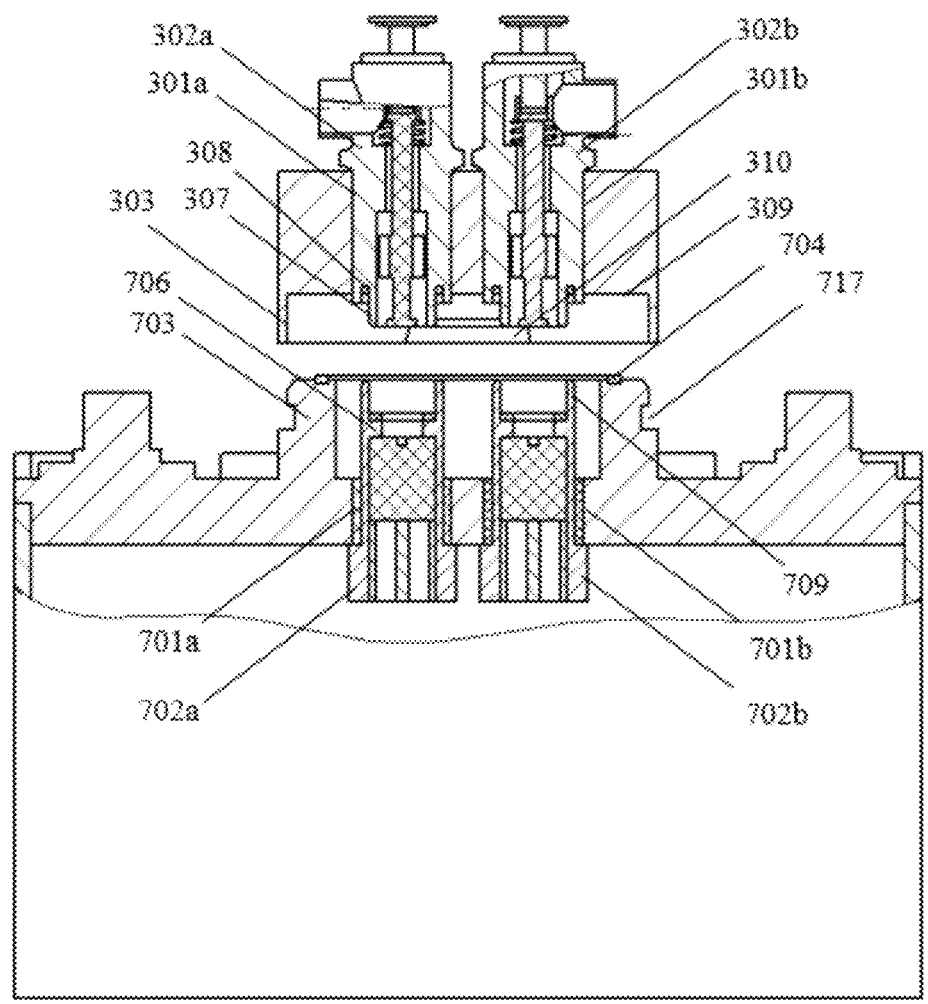
FIG. 5(a) shows a state in which an equipment butting device is separated from a cover butting device.
Figure 5B:
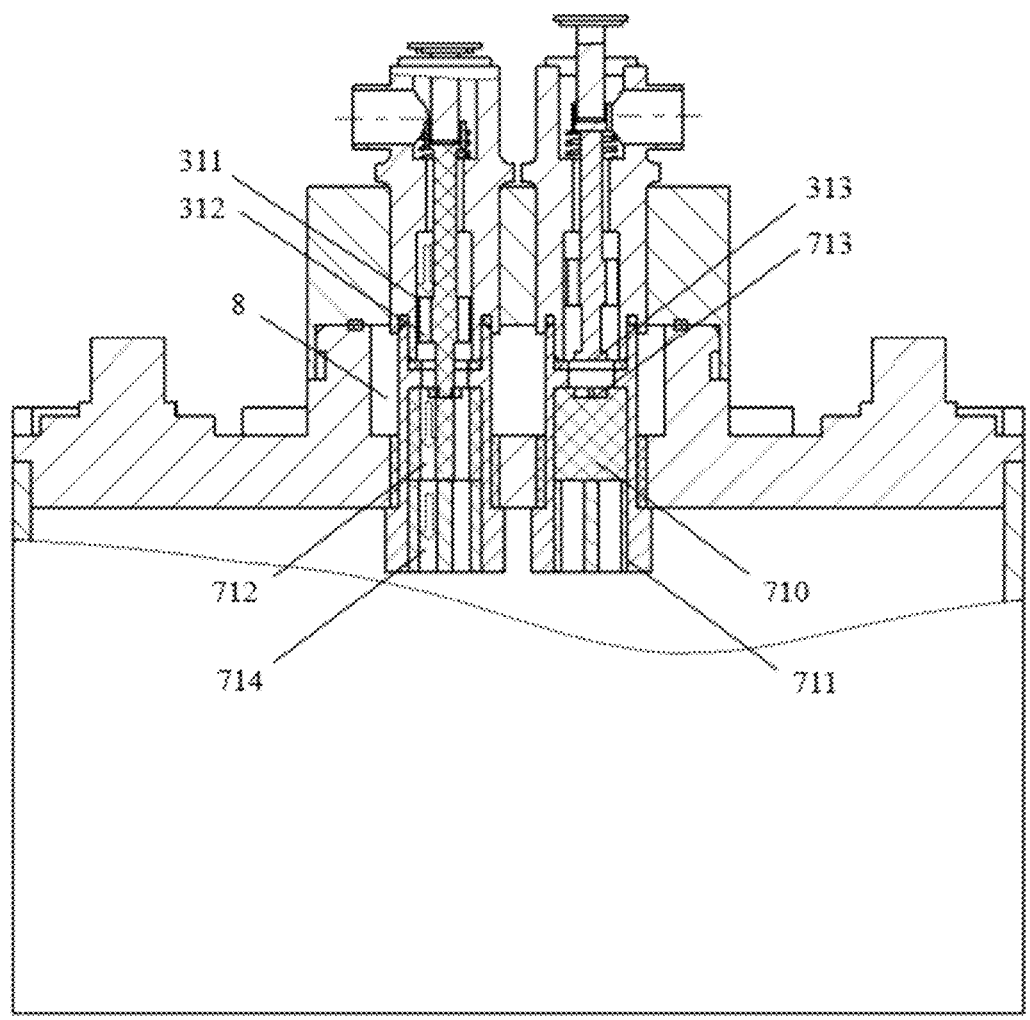
FIG. 5(b) shows a state in which the equipment butting device butts against the cover butting device.

FIG. 5 is a partial sectional view showing butting devices for a lithium slurry battery and a maintenance and regeneration equipment according to another embodiment of the present disclosure. FIG. 5(a) shows a state in which an equipment butting device is separated from a cover butting device. FIG. 5(b) shows a state in which the equipment butting device butts against the cover butting device, where a left portion shows that the first trigger mechanism actuates the first opening switch mechanism and a fluid passage (which is denoted by an arrow shown in FIG. 5(b)) is enabled, and a right portion shows that the second trigger mechanism does not actuate the second opening switch mechanism and the fluid passage is closed. The equipment butting device includes a first mounting hole 301a, a second mounting hole 301b, the first trigger mechanism 302a, the second trigger mechanism 302b, and an equipment butting device engagement portion 303. Fixed portions of the first trigger mechanism 302a and the second trigger mechanism 302b are respectively hermetically fixed in the first mounting hole 301a and the second mounting hole 301b. In the equipment butting device, the equipment butting device engagement portion 303 includes an engagement hole 309. A snap member 310 is arranged on an inner wall of the engagement hole 309. Each of the first trigger mechanism 302a and the second trigger mechanism 302b includes a bore and a trigger mechanism cylinder 311 that is rotatable in the bore. The trigger mechanism cylinder 311 is provided with a trigger mechanism channel 312 and an insertion portion 313. The trigger mechanism cylinder 311 may be controlled manually or by a control device to move upwards and downwards and rotate in the bore. Each of the first trigger mechanism 302a and the second trigger mechanism 302b is further provided with an inner insertion wall 307 and a second groove 308 surrounding the inner insertion wall 307. A second sealing member is arranged in the second groove 308. The cover butting device includes a first opening 701a, a second opening 701b, the first opening switch mechanism 702a, the second opening switch mechanism 702b, and the cover butting device engagement portion 703. Fixed portions of the first opening switch mechanism 702a and the second opening switch mechanism 702b are respectively hermetically fixed in the first opening 701a and the second opening 70l b. In the cover butting device, the cover butting device engagement portion 703 is a cylinder surrounding the first opening switch mechanism 702a and the second opening switch mechanism 702b. A snap slot 717 is provided on a side surface of the cover butting device engagement portion 703. A first groove 704 and a first sealing member are arranged on a top surface of the cover butting device engagement portion 703. Each of the first opening switch mechanism 702a and the second opening switch mechanism 702b is provided with a rotatable opening switch mechanism cylinder 710 and a fixed opening switch mechanism cylinder 711. The rotatable opening switch mechanism cylinder 710 is provided with a first opening switch mechanism channel 712 and an insertion hole 713. The fixed opening switch mechanism cylinder 711 is provided with a second opening switch mechanism channel 714. In a normal state, the first opening switch mechanism channel 712 is misaligned with the second opening switch mechanism channel 714 (see the opening switch mechanism on the right side of FIG. 5(b)), to seal the bore of the opening switch mechanism. Each of the first opening switch mechanism 702a and the second opening switch mechanism 702b may be further provided with an outer insertion wall 709. Further, a third sealing member may be arranged on a top surface of the boss portion 706 in the bore.

A butting process between the butting devices is described below with reference to FIG. 5. Firstly, the equipment butting device butts against the cover butting device. The guide holes of the equipment butting device and the guide posts of the cover butting device are accurately positioned, such that the two trigger mechanisms of the equipment butting device are respectively aligned with the two opening switch mechanisms of the cover butting device, and the equipment butting device engagement portion is aligned with the cover butting device engagement portion. Then, the engagement hole 309 of the equipment butting device engagement portion 303 is sleeved on the cylindrical cover butting device engagement portion 703. The telescopic snap member 310 of the equipment butting device engagement portion is snapped into the snap slot 717 of the cover butting device engagement portion, and the trigger mechanism hermetically butts against the corresponding opening switch mechanism. A cavity 8 formed by the equipment butting device engagement portion 303 and the cover butting device engagement portion 703 is vacuumized and is filled with a noble gas via an interface (which is not shown) of the equipment butting device. A first sealing arrangement is formed between the cover butting device engagement portion 703 and the equipment butting device engagement portion 303 by using the first sealing member arranged on the top surface of the cover butting device engagement portion 703. A second sealing arrangement is formed between the second groove 308 of the trigger mechanism and the outer insertion wall 709 of the opening switch mechanism by using the second sealing member arranged in the second groove 308 of the trigger mechanism. A third sealing arrangement is formed between the inner insertion wall 307 of the trigger mechanism and the boss portion 706 of the opening switch mechanism by using the third sealing member arranged on the boss portion 706 of the opening switch mechanism. The trigger mechanism cylinder 311 in the first trigger mechanism 302a is actuated to insert the insertion portion 313 of the trigger mechanism cylinder 311 into the insertion hole 713 of the rotatable opening switch mechanism cylinder 710, such that the trigger mechanism channel 312 of the trigger mechanism cylinder 311 is in fluid communication with the first opening switch mechanism channel 712 of the rotatable opening switch mechanism cylinder 710. The trigger mechanism cylinder 311 is rotated to drive the rotatable opening switch mechanism cylinder 710 to rotate, such that the trigger mechanism channel 312 and the first opening switch mechanism channel 712 are in fluid communication with the second opening switch mechanism channel 714 of the fixed opening switch mechanism cylinder 711, such that a fluid passage for fluid circulation is formed between the bore in the first trigger mechanism 302a and the bore in the first opening switch mechanism 702a. After the maintenance and regeneration process is completed, the trigger mechanism cylinder 311 is further rotated to drive the rotatable opening switch mechanism cylinder 710 to rotate, such that the trigger mechanism channel 312 and the first opening switch mechanism channel 712 are misaligned with the second opening switch mechanism channel 714 of the fixed opening switch mechanism cylinder 711, so as to seal the bore of the first opening switch mechanism and further cut off the fluid passage between the bore of the first trigger mechanism 302a and the bore in the first opening switch mechanism 702a. The insertion portion 313 of the trigger mechanism cylinder 311 is removed from the insertion hole 713 of the rotatable opening switch mechanism cylinder 710. Then, the telescopic snap member 310 of the equipment butting device engagement portion is retracted to be separated from the snap slot 717 of the cover butting device engagement portion, and the equipment butting device is removed from the cover butting device.

Figure 6:
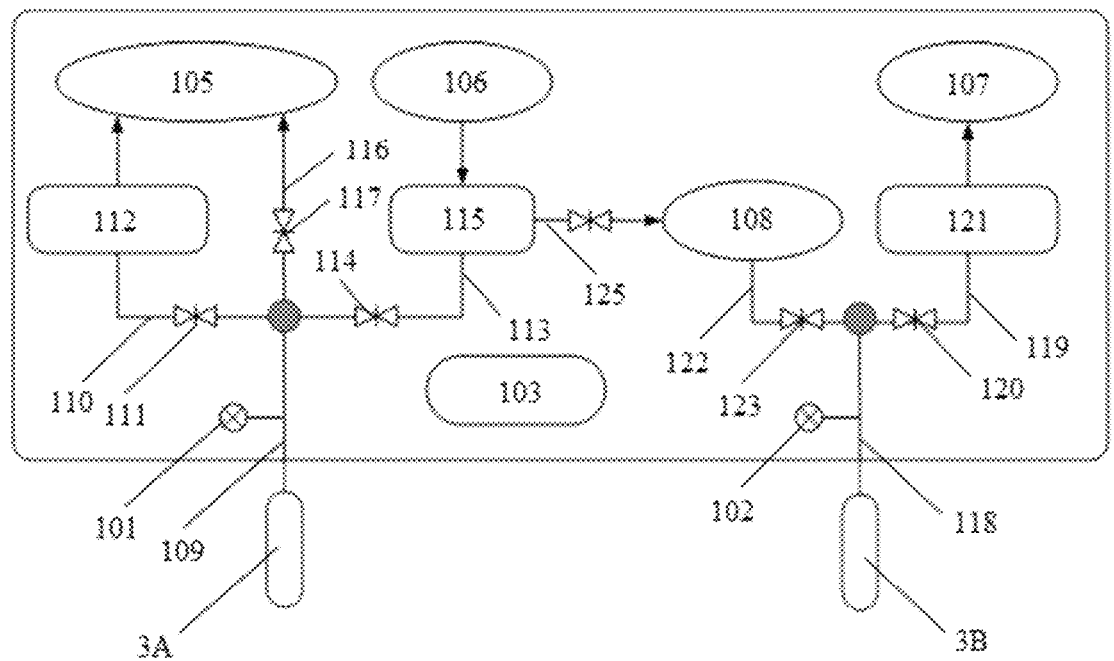
FIG. 6 is a schematic structural diagram showing a maintenance and regeneration equipment according to an embodiment of the present disclosure.

FIG. 6 is a schematic structural diagram showing a maintenance and regeneration equipment according to an embodiment of the present disclosure. The maintenance and regeneration equipment includes a first equipment port 3A, a vacuum device 112, a gas-driving device 115, a third gas control valve 117, a gas recovery storage tank 105, a gas storage tank 106, a second equipment port 3B, a first liquid pump 121, a liquid recovery storage tank 107, and a liquid storage tank 108. The first equipment port 3A is connected to the gas recovery storage tank 105 via a first header pipe 109 and a first gas pipeline 110. A first gas control valve 11 and the vacuum device 112 are arranged on the first gas pipeline 110. The first equipment port 3A is connected to the gas storage tank 106 via the first header pipe 109 and a second gas pipeline 113. A second gas control valve 114 and the gas-driving device 115 are arranged on the second gas pipeline 113. The first equipment port 3A is connected to the gas recovery storage tank 105 via the first header pipe 109 and a third gas pipeline 116. The third gas control valve 117 is arranged on the third gas pipeline 116. The second equipment port 3B is connected to the gas recovery storage tank 107 via a second header pipe 118 and a first liquid pipeline 119. A first liquid control valve 120 and the first liquid pump 121 are arranged on the first liquid pipeline 119. The second equipment port 3B is connected to the liquid storage tank 108 via the second header pipe 118 and a second liquid pipeline 122. A second liquid control valve 123 is arranged on the second liquid pipeline 122. The liquid storage tank 108 is connected to the gas-driving device 115 via a gas-driving pipeline 125. A gas pressure gauge 101 is arranged in the first header pipe 109. A liquid pressure gauge 102 is arranged in the second header pipe 118. The control valves, the vacuum device, the gas-driving device and the liquid pump may be controlled by a control device 103.

Figure 7:
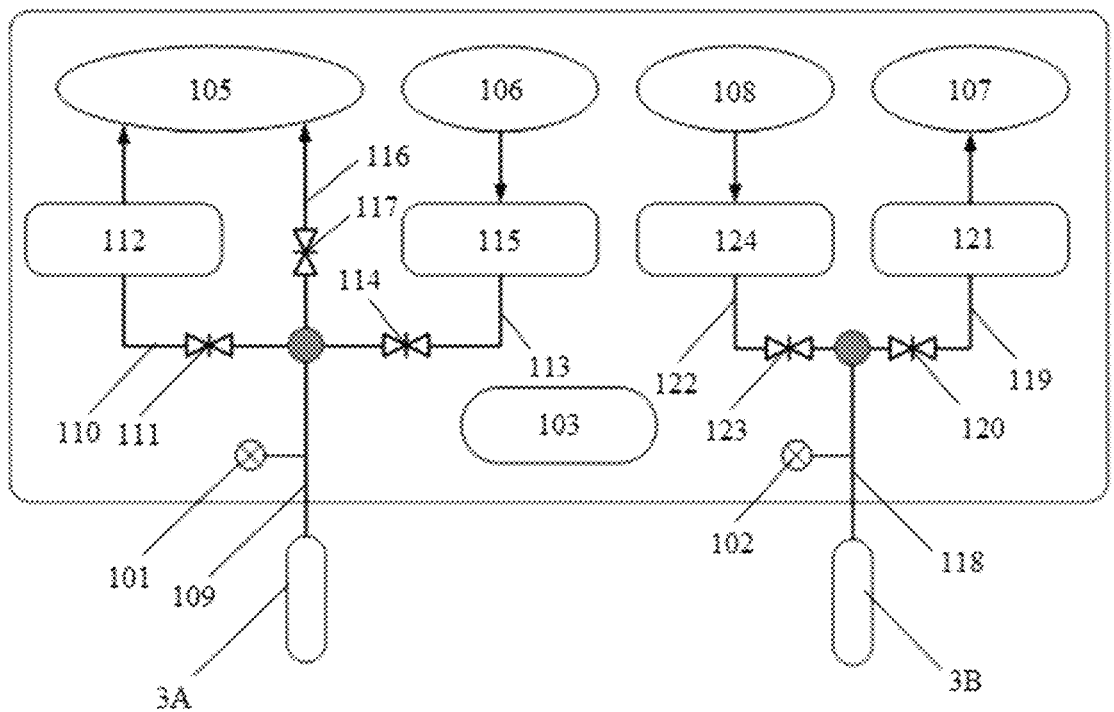
FIG. 7 is a schematic structural diagram showing a maintenance and regeneration equipment according to another embodiment of the present disclosure.

FIG. 7 is a schematic structural diagram showing a maintenance and regeneration equipment according to another embodiment of the present disclosure. This embodiment differs from the above embodiment in that, the second equipment port 3B is connected to the liquid storage tank 108 via the second header pipe 118 and the second liquid pipeline 122, and a second liquid pump 124 and the second liquid control valve 123 are arranged on the second liquid pipeline 122. That is, liquid in the liquid storage tank 108 is driven by the second liquid pump 124, rather than by the gas-driving device 115 and gas in the gas storage tank 106.

Figure 8:
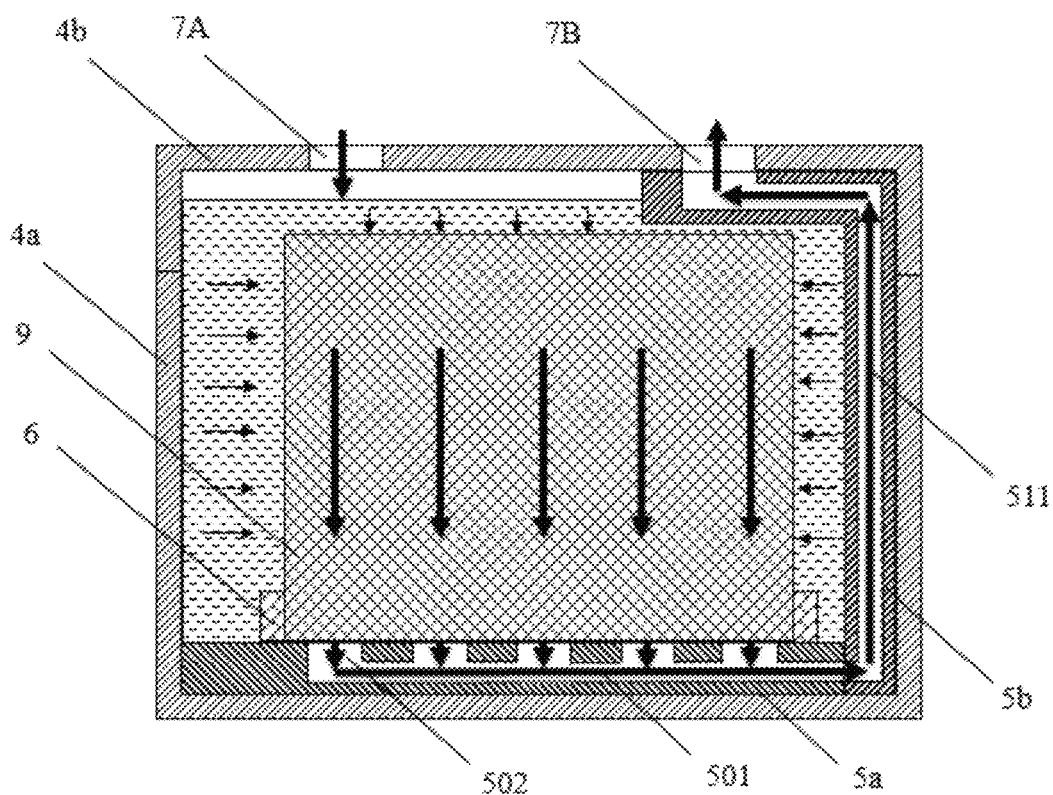
FIG. 8 is a schematic diagram showing a fluid flow path in a lithium slurry battery provided in the present disclosure.

FIG. 8 is a schematic diagram showing a fluid flow path in a lithium slurry battery provided in the present disclosure. The lithium slurry battery provided in the present disclosure may include a case, a cell core and a discharging device. The case is provided with a cover 4b and a case body 4a. The cover 4b is provided with a first cover port 7A and a second cover port 7B. The discharging device includes a seepage support portion 5a, and a suction portion 5b. A peripheral sidewall of the cell core 9 is hermetically connected to the seepage support portion 5a of the discharging device. A discharging passage 501 of the seepage support portion 5a is in fluid communication with one end of the suction portion 5b. The other end of the suction portion 5b is connected to the second cover port 7B of the cover. It can be seen from FIG. 8 that, a fixed fluid flow path is defined by a sealing portion 6 between the cell core and the seepage support portion, a seepage space 502 of the seepage support portion 5a, the discharging passage 501 of the seepage support portion 5a, a suction passage 511 of the suction portion 5b, and the second cover port 7B. An electrolyte injected into the case via the first cover port 7A flows in the cell core 9 firstly. When a suction process is performed by a suction device at the second cover port 7B, the electrolyte in the cell core seeps downwardly into the seepage space 502 of the seepage support portion 5a, and is discharged from the battery case via the discharging passage 501 and the suction passage 511 of the suction portion 5b. In this case, the electrolyte in the case cannot be suctioned directly from the battery case by bypassing the cell core, but can only be discharged from the case via the cell core, so that the cell core can be washed. It should be noted that another suction pipeline may be arranged in the case. One end of the suction pipeline is connected to the second cover port, and the other end of the suction pipeline extends to a bottom of the case. In this way, liquid in the cell core and liquid in the case can be quickly suctioned simultaneously or sequentially. Further, the seepage space of the seepage support portion may collect electric-conductive electrode particles leaked from an electrode piece, and may discharge the collected electric-conductive electrode particles from the battery case during the battery electrolyte replacement, thereby effectively avoiding a short circuit due to leakage of the electric-conductive electrode particles of the electrode piece.

Figure 9A:
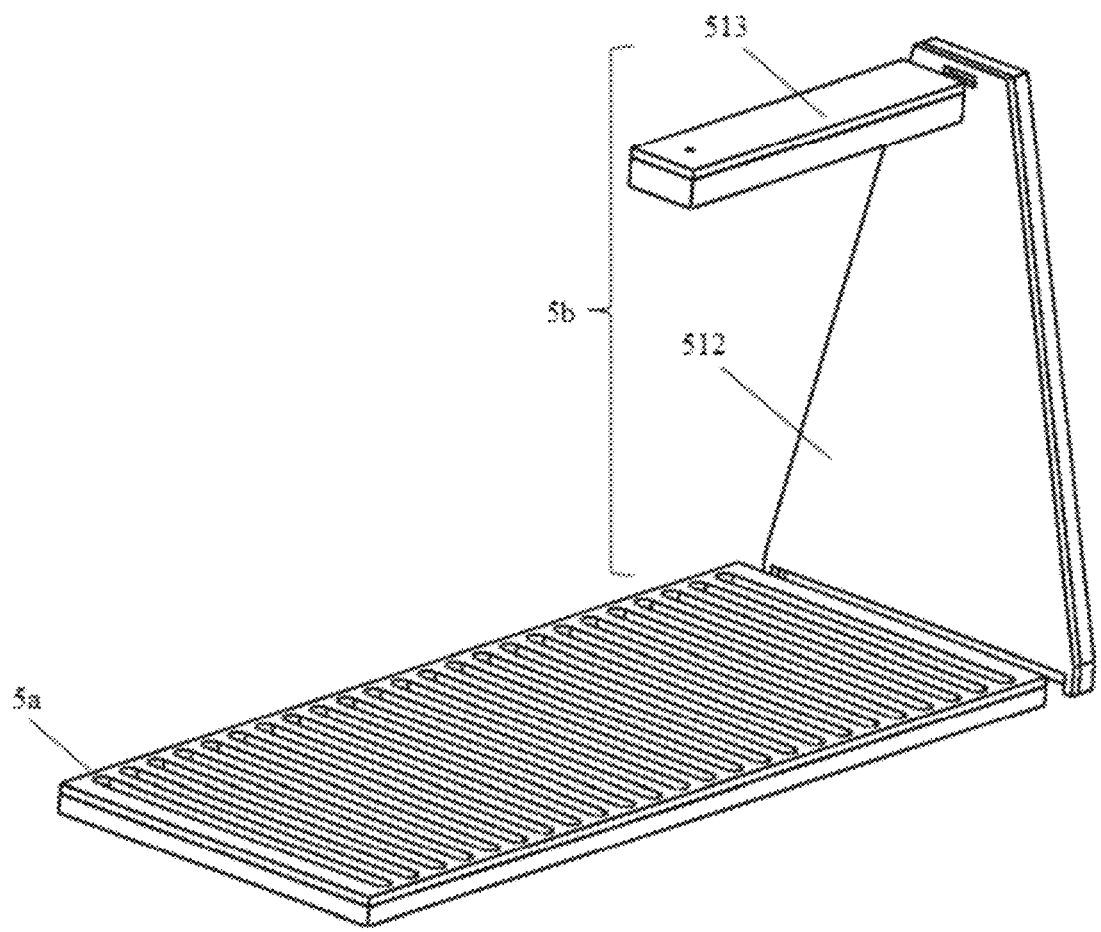
FIG. 9 is a schematic diagram showing a discharging device according to an embodiment of the present disclosure, where FIGS. 9(a) to 9(d) respectively show the whole discharging device, a seepage support portion, a guide plate and a fluid flow path.
Figure 9B:
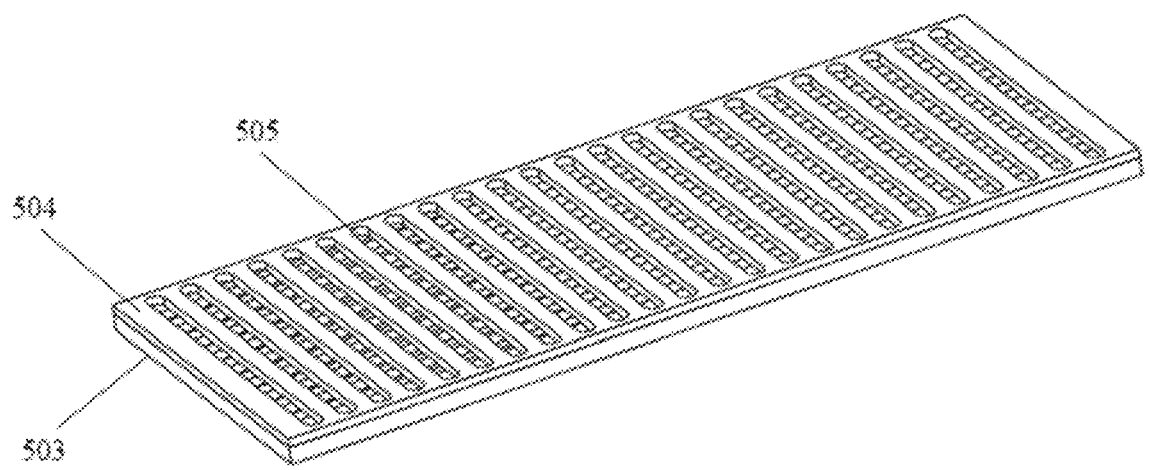
Figure 9C:
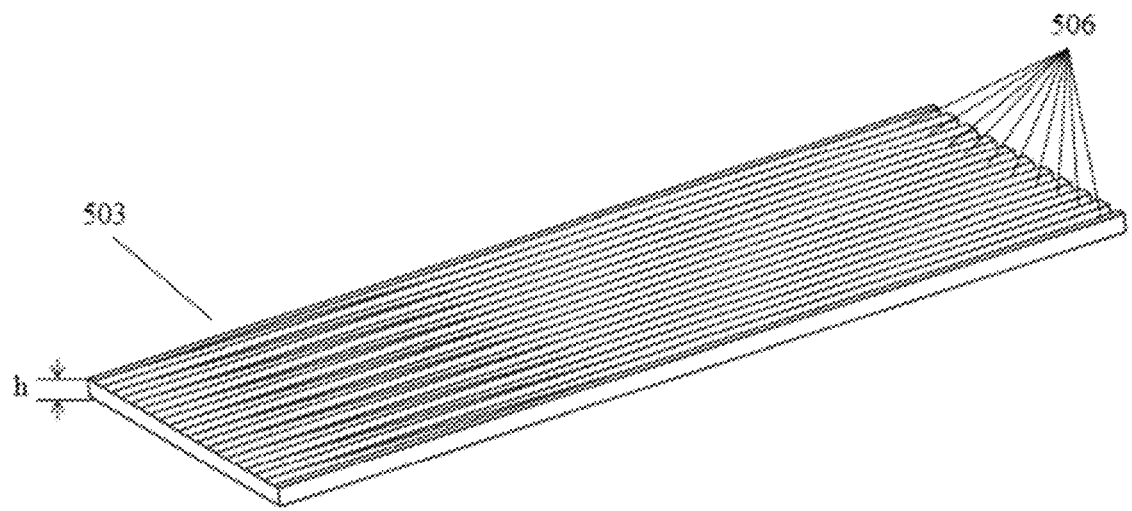
Figure 9D:
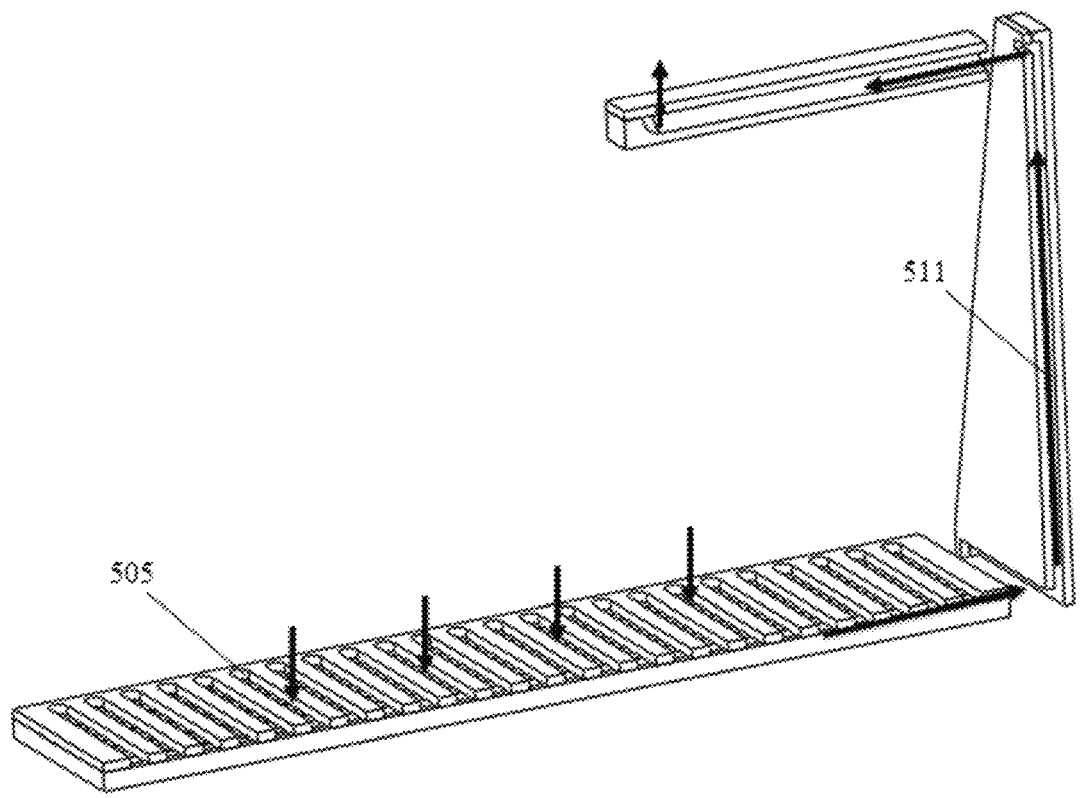

FIG. 9 is a schematic diagram showing a discharging device according to an embodiment of the present disclosure, where FIGS. 9(a) to 9(d) respectively show the whole discharging device, a seepage support portion, a guide plate and a fluid flow path. As shown in FIG. 9(a), the discharging device includes a seepage support portion 5a and a suction portion 5b. The suction portion 5b includes a vertical suction portion 512 and a horizontal suction portion 513. The vertical suction portion 512 is a hollow vertical suction box having a trapezoidal shape. The horizontal suction portion 513 is a hollow horizontal suction box having a square shape. A wider lower end portion of the vertical suction box has a width substantially equal to a width of the seepage support portion 5a, and may be connected to the seepage support portion. One end of the horizontal suction box is connected to a top end of the vertical suction box, and an opening at the other end of the horizontal suction box is connected to the second cover port of the cover. The horizontal suction box and the vertical suction box may be connected with each other by assembly or may be formed integrally with each other. As shown in FIG. 9(b) and FIG. 9(c), the seepage support portion has a double-layer structure. An upper layer of the seepage support portion is a seepage plate 504, and a lower layer of the seepage support portion is a guide plate 503. The seepage plate 504 has a planar structure and is provided with multiple elongated through holes 505. The fluid in the cell core may seep downwards via the elongated through holes 505 of the seepage plate. The guide plate 503 is provided with multiple parallel inclined grooves 506. The inclined grooves 506 gradually incline from one end of the guide plate 503 towards the other end of the guide plate. A depth of the inclined groove ranges from 0 to h, where h denotes a thickness of the guide plate. The inclined grooves serve as a seepage space in which the fluid flows from the top, and also serves as a discharging passage via which the fluid in the seepage space is discharged. An arrow in FIG. 9(d) shows a fluid flow path. The fluid in the cell core firstly flows downwards in the inclined grooves of the guide plate via the through holes 505 of the seepage plate. Then, the fluid in the inclined grooves flows towards the lower end, and further flows in a cavity of the vertical suction box and is suctioned into a cavity of the horizontal suction box. Finally, the fluid in the cavity of the horizontal suction box is suctioned from the battery case via the opening on a top surface of the horizontal suction box. The cavity of the vertical suction box and the cavity of the horizontal suction box together form the suction passage 511.

Figure 10A:
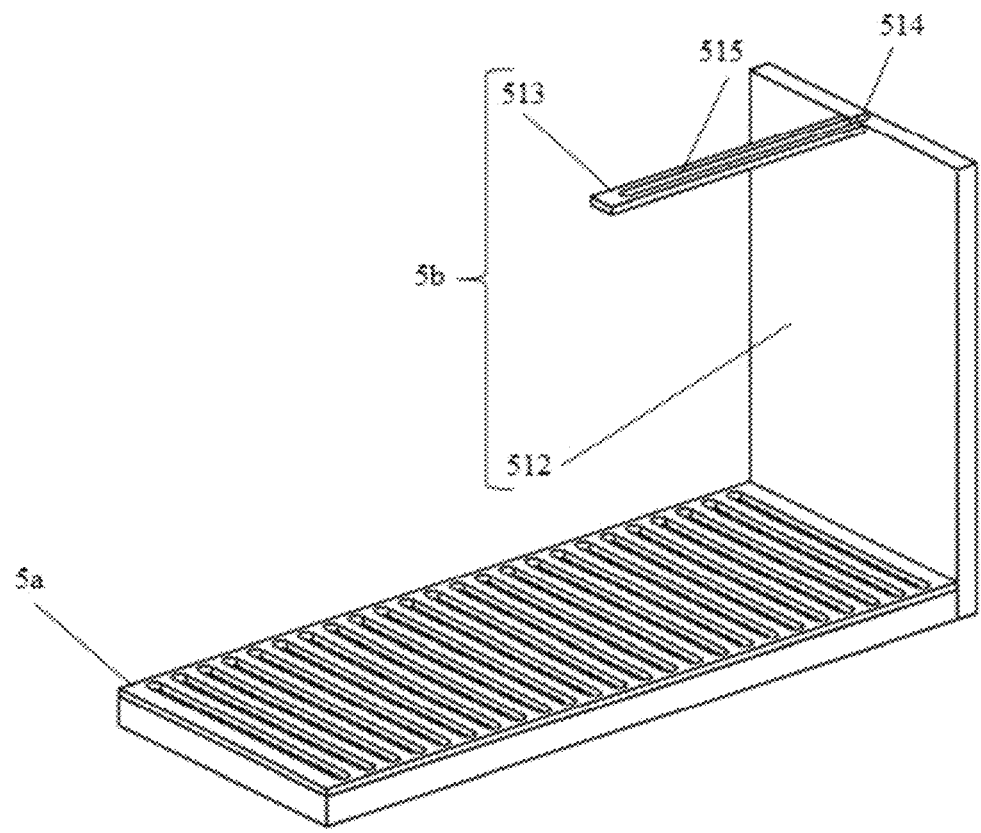
FIG. 10 is a schematic diagram showing a discharging device according to another embodiment of the present disclosure, where FIGS. 10(a) to 10(d) respectively show the whole discharging device, a seepage support portion, a guide plate and a fluid flow path.
Figure 10B:
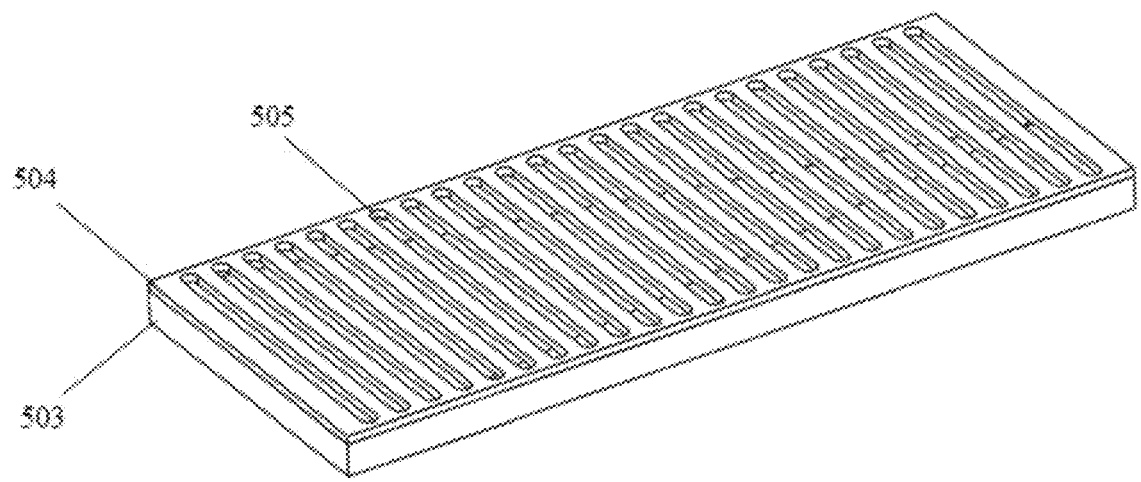
Figure 10C:
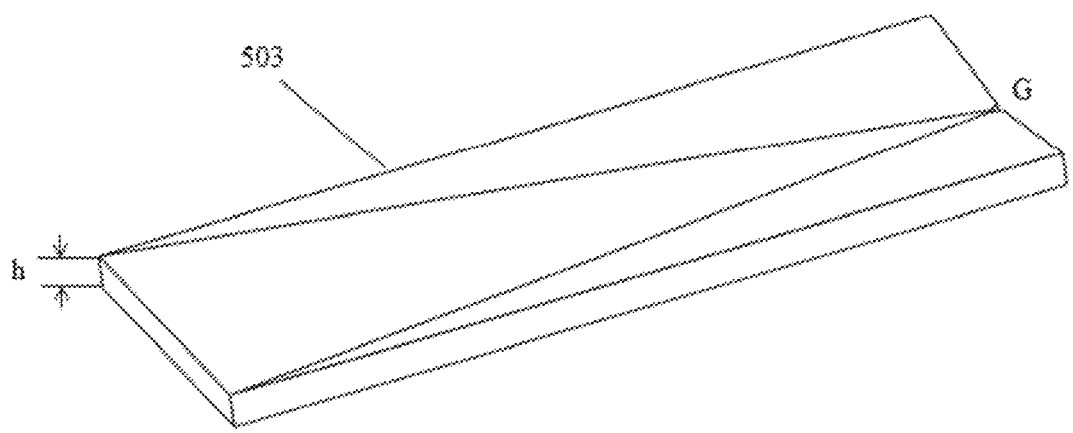
Figure 10D:
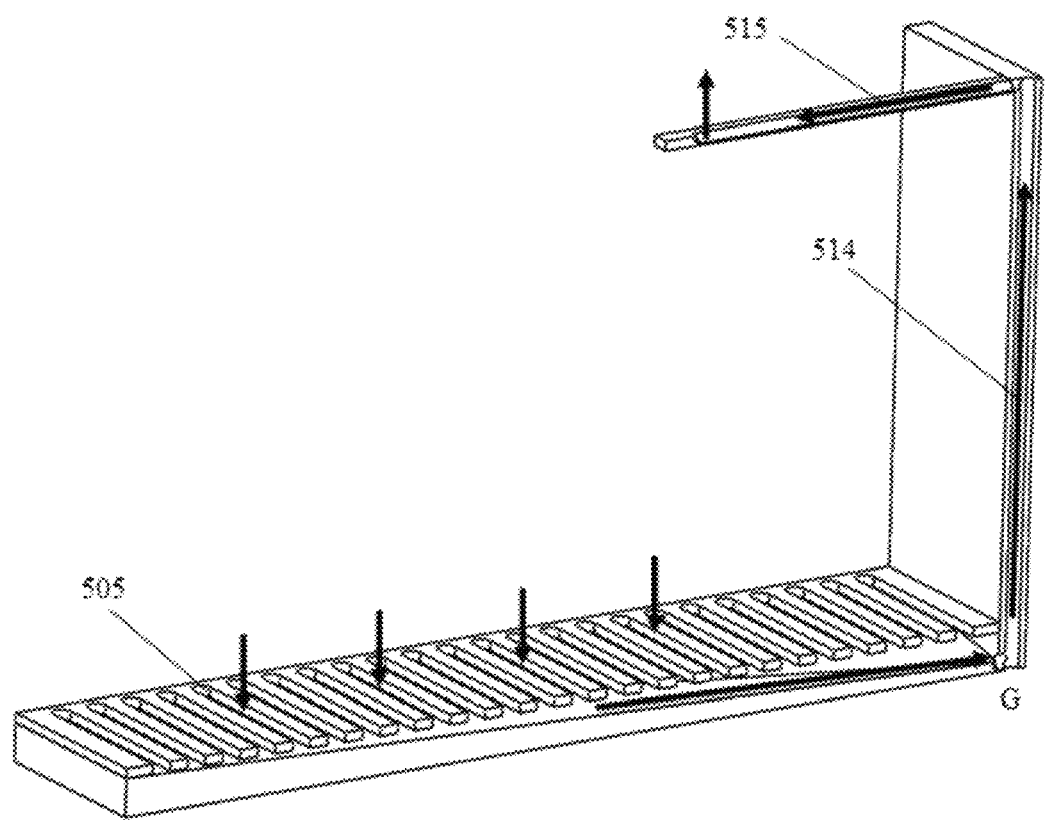

FIG. 10 is a schematic diagram showing a discharging device according to another embodiment of the present disclosure, where FIGS. 10(a) to 10(d) respectively show the whole discharging device, a seepage support portion, a guide plate and a fluid flow path. As shown in FIG. 10(a), the discharging device includes a seepage support portion 5a and a suction portion 5b. The suction portion 5b includes a vertical suction portion 512 and a horizontal suction portion 513. The vertical suction portion 512 is a vertical wall provided with a tubular vertical passage 514. The horizontal suction portion 513 is a horizontal strip provided with a grooved horizontal passage 515. A lower end portion of the vertical wall has a width substantially equal to a width of the seepage support portion 5a, and may be connected to the seepage support portion. One end of the horizontal strip is connected to a top end of the vertical wall, and an upper surface of the horizontal strip is fixed to a lower surface of the cover, such that one end of the grooved horizontal passage 515 of the horizontal strip is in fluid communication with a top end of the tubular vertical passage 514, and the other end of the grooved horizontal passage 515 of the horizontal strip is in fluid communication with the second cover port of the cover. The horizontal strip and the vertical wall may be connected with each other by assembly or may be formed integrally with each other. As shown in FIG. 10(b) and FIG. 10(c), the seepage support portion has a double-layer structure. An upper layer of the seepage support portion is a seepage plate 504, and a lower layer of the seepage support portion is a guide plate 503. The seepage plate 504 has a planar structure and is provided with multiple elongated through holes 505. The fluid in the cell core may seep downwards via the elongated through holes 505 of the seepage plate. The guide plate 503 is provided with three triangular inclined surfaces. One vertex is determined for each of triangles of the three triangular inclined surfaces, and the determined vertexes of the triangles converge at a convergence point G. The convergence point G is located on an edge of the guide plate at a height lower than a height h of the guide plate. An arrow in FIG. 10(d) shows a fluid flow path. The fluid in the cell core firstly flows downwards in a seepage space formed by the inclined surfaces of the guide plate via the through holes 505 of the seepage plate. Then, the fluid in the seepage space flows to the convergence point G and further flows to a lower end of the tubular vertical passage 514 in fluid communication with the convergence point G and is suctioned into the grooved horizontal passage 515 of the horizontal strip from the tubular vertical passage 514. Finally, the fluid in the grooved horizontal passage is suctioned from the battery case via the second cover port. The tubular vertical passage 514 and grooved horizontal passage 515 together form a suction passage.

Figure 11A:
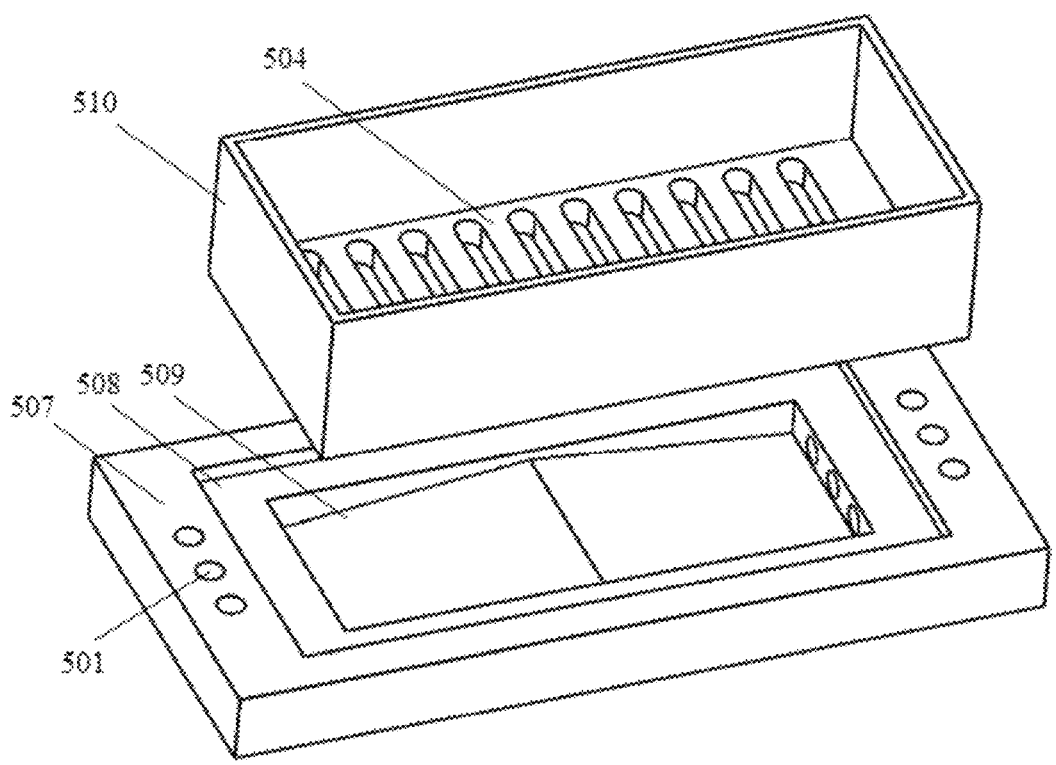
FIG. 11 is a schematic diagram showing a seepage support portion according to another embodiment of the present disclosure, where FIG. 11(a) and FIG. 11(b) respectively show an exploded view and an overall view of the seepage support portion.
Figure 11B:
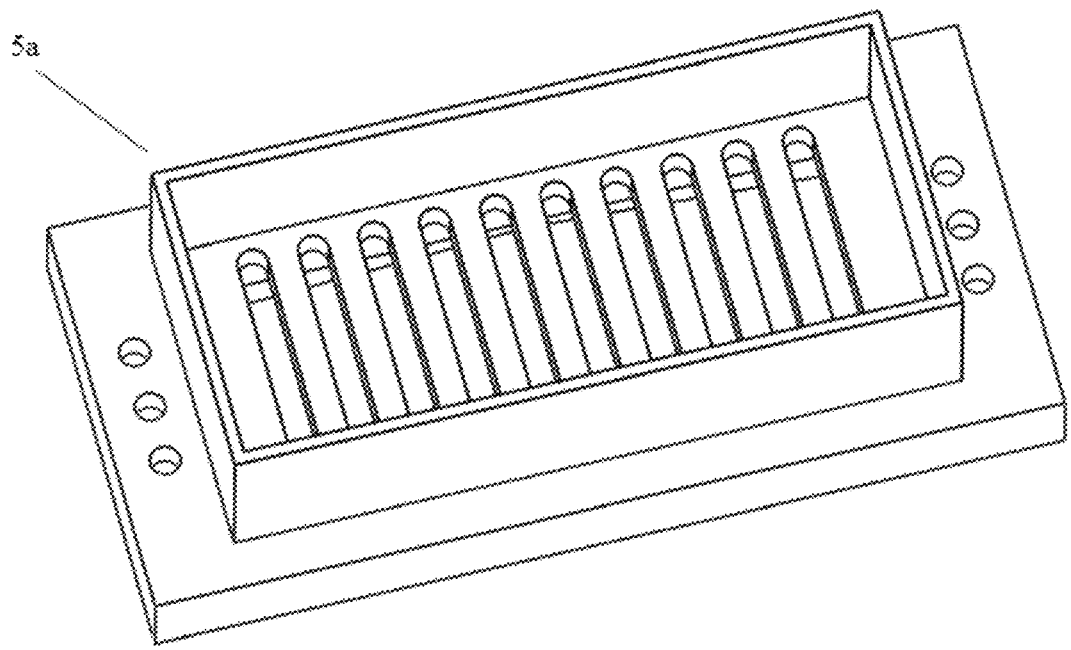

FIG. 11 is a schematic diagram showing a seepage support portion according to another embodiment of the present disclosure, where FIG. 11(a) and FIG. 11(b) respectively show an exploded view and an overall view of the seepage support portion. The seepage support portion is implemented by a base. The base includes a base sidewall 507, a support table 508, and a guide cavity 509. The guide cavity 509 is arranged in the middle of the support table 508. A bottom surface of the guide cavity 509 is a convex surface of which a center region is higher than two ends, such that fluid in the guide cavity is guided to the two ends of the guide cavity. The highest point of the convex surface is lower than a top surface of the support table 508, so that the seepage plate 504 can be smoothly arranged on the top surface of the support table 508. Multiple discharging passages 501 are provided between a sidewall of the guide cavity 509 and the base sidewall 507. The fluid guided to the two ends of the guide cavity is suctioned via the discharging passages 501. The seepage support portion further includes a vertical sidewall 510 and a seepage plate 504. The vertical sidewall 510 and the seepage plate 504 herein are integrally formed in a box shape and may be fixed to the support table 508. The cell core may be securely arranged in the box structure formed by the vertical sidewall 510 and the seepage plate 504. The vertical sidewall may support the cell core, and an upper end of the vertical sidewall may be hermetically connected to a sidewall of the cell core.

Specific embodiments of the present disclosure are not intended to limit the present disclosure. Those skilled in the art may make, based on the disclosed method and technical content, some variations and improvements on the technical solutions of the present disclosure, or make some equivalent variations on the embodiments without departing from the scope of the technical solutions. All simple modifications, equivalent variations and improvements made based on the technical essence fall in the scope of the technical solutions of the present disclosure.

The invention claimed is:

1. A lithium slurry battery system, comprising:
  a lithium slurry battery comprising:
    a case provided with a cover and a case body;
    a cell core accommodated in the case; and
    a cover butting device arranged on the cover and provided with a first cover port and a second cover port; and
  a maintenance and regeneration equipment for the lithium slurry battery, the maintenance and regeneration equipment comprising:
    a gas storage tank for storing gas;
    a liquid storage tank for storing liquid;
    a gas recovery storage tank for storing gas recovered from the lithium slurry battery;
    a liquid recovery storage tank for storing liquid recovered from the lithium slurry battery; and
    an equipment butting device provided with a first equipment port and a second equipment port, wherein
  the first cover port is capable of butting against the first equipment port, and the second cover port is capable of butting against the second equipment port, to inject the gas stored in the gas storage tank or the liquid stored in the liquid storage tank into the lithium slurry battery, or to discharge gas or liquid in the lithium slurry battery into the gas recovery storage tank or the liquid recovery storage tank.

2. The lithium slurry battery system according to claim 1, wherein
the first cover port is provided with a first opening and a first opening switch mechanism, wherein the first opening extends through the cover, and the first opening switch mechanism is arranged in the first opening to control a fluid passage in the first opening to be enabled or to be cut off;
the second cover port is provided with a second opening and a second opening switch mechanism, wherein the second opening extends through the cover, and the second opening switch mechanism is arranged in the second opening to control a fluid passage in the second opening to be enabled or to be cut off;
the first equipment port is provided with a first mounting hole at a position corresponding to the first opening and a first trigger mechanism arranged in the first mounting hole;
the second equipment port is provided with a second mounting hole at a position corresponding to the second opening and a second trigger mechanism arranged in the second mounting hole;
the first trigger mechanism and the second trigger mechanism are used to respectively trigger the first opening switch mechanism and the second opening switch mechanism to separately or concurrently open the first opening switch mechanism and the second opening switch mechanism, to form fluid communication between the first cover port and the first equipment port and/or between the second cover port and the second equipment port; and
the first trigger mechanism and the second trigger mechanism are further used to respectively trigger the first opening switch mechanism and the second opening switch mechanism to separately or concurrently close the first opening switch mechanism and the second opening switch mechanism, to cut off the fluid communication between the first cover port and the first equipment port and/or between the second cover port and the second equipment port.

3. The lithium slurry battery system according to claim 2, wherein
each of the first trigger mechanism and the second trigger mechanism is provided with an inner insertion wall and a second groove surrounding the inner insertion wall, and a second sealing member is arranged in the second groove;
each of the first opening switch mechanism and the second opening switch mechanism is provided with an outer insertion wall, a bore located inside the outer insertion wall, and a boss portion located in the bore, and a third sealing member is arranged on the boss portion;
the inner insertion wall of each of the first trigger mechanism and the second trigger mechanism is capable of being abutted against the boss portion, to form a sealing arrangement by the third sealing member; and
the outer insertion wall of each of the first opening switch mechanism and the second opening switch mechanism is insertable into the second groove, to form a sealing arrangement by the second sealing member.

4. The lithium slurry battery system according to claim 3, wherein
each of the first trigger mechanism and the second trigger mechanism includes a movable ejector block;
each of the first opening switch mechanism and the second opening switch mechanism includes an ejector pin, a stopper block connected to the ejector pin and abutted against the boss portion, and a spring connected to the stopper block;
the ejector block is used to push the ejector pin to drive the stopper block to move away from the boss portion, to enable a fluid passage in the first opening switch mechanism and the first trigger mechanism and/or in the second opening switch mechanism and the second trigger mechanism; and
the spring is used to force the ejector pin and the stopper block to return, to cut off the fluid passage.

5. The lithium slurry battery system according to claim 2, wherein
each of the first trigger mechanism and the second trigger mechanism comprises a rotatable trigger mechanism cylinder, and the trigger mechanism cylinder is provided with a trigger mechanism channel and an insertion portion;
each of the first opening switch mechanism and the second opening switch mechanism is provided with a rotatable opening switch mechanism cylinder and a fixed opening switch mechanism cylinder, wherein the rotatable opening switch mechanism cylinder is provided with a first opening switch mechanism channel and an insertion hole, and the fixed opening switch mechanism cylinder is provided with a second opening switch mechanism channel; and
in a case that the insertion portion is inserted into the insertion hole, the trigger mechanism channel is in fluid communication with the first opening switch mechanism channel, and the rotatable opening switch mechanism cylinder is capable of being rotated by the trigger mechanism cylinder so that the trigger mechanism channel and the first opening switch mechanism channel are in fluid communication with the second opening switch mechanism channel to enable a fluid passage, and the rotatable opening switch mechanism cylinder is capable of being further rotated by the trigger mechanism cylinder so that the trigger mechanism channel and the first opening switch mechanism channel are misaligned with the second opening switch mechanism channel to cut off the fluid passage.

6. The lithium slurry battery system according to claim 2, wherein
the cover butting device is provided with a reverse connection preventing portion that is protruded or recessed, and the protruded or recessed reverse connection preventing portion of the cover butting device is engageable with a recessed or protruded reverse connection preventing portion of the equipment butting device to prevent the first opening switch mechanism and the second opening switch mechanism from being reversely connected with the first trigger mechanism and the second trigger mechanism; or
the cover butting device is provided with a magnet, and the equipment butting device is provided with a magnet having a polarity opposite to a polarity of the magnet of the cover butting device at a corresponding position, and the magnet of the cover butting device and the magnet of the equipment butting device attract each other to prevent the first opening switch mechanism and the second opening switch mechanism from being reversely connected with the first trigger mechanism and the second trigger mechanism; or
each of the cover butting device and the equipment butting device has a non-centrosymmetric shape including a triangular shape, a trapezoidal shape or a pentagonal shape, and the cover butting device having the non-centrosymmetric shape butts against the equipment butting device having the non-centrosymmetric shape to prevent the first opening switch mechanism and the second opening switch mechanism from being reversely connected with the first trigger mechanism and the second trigger mechanism; or the first trigger mechanism and the second trigger mechanism of the equipment butting device have different sizes, and the first trigger mechanism and the second trigger mechanism are respectively engaged with the first opening switch mechanism and the second opening switch mechanism that have different sizes to prevent the first opening switch mechanism and the second opening switch mechanism from being reversely connected with the first trigger mechanism and the second trigger mechanism; or the first trigger mechanism and the second trigger mechanism of the equipment butting device have different colors, and the colors of the first trigger mechanism and the second trigger mechanism respectively correspond to colors of the first opening switch mechanism and the second opening switch mechanism to prevent the first opening switch mechanism and the second opening switch mechanism from being reversely connected with the first trigger mechanism and the second trigger mechanism.

7. The lithium slurry battery system according to claim 1, wherein
the cover butting device is further provided with a cover butting device engagement portion, wherein the cover butting device engagement portion is an outer wall extending upwards from the cover and continuously surrounding the first cover port and the second cover port, the cover butting device engagement portion is provided with a first groove, and a first sealing member is arranged in the first groove; and the equipment butting device is further provided with an equipment butting device engagement portion, wherein the equipment butting device engagement portion is an outer wall continuously surrounding the first equipment port and the second equipment port, and the equipment butting device engagement portion engages with or disengages from the cover butting device engagement portion, wherein
in a case that the equipment butting device engagement portion engages with the cover butting device engagement portion, a cavity is formed, the cavity is capable of being vacuumized or being filled with a noble gas or a flame retardant gas, and the cavity is sealed by the first sealing member to prevent ingress of external moisture or air.

8. The lithium slurry battery system according to claim 7, wherein
each of the equipment butting device engagement portion and the cover butting device engagement portion is provided with an external thread, a connection ring is arranged outside the equipment butting device engagement portion or the cover butting device engagement portion, and the connection ring is provided with an internal thread, and the connection ring is rotated so that the connection ring is moved to a junction between the equipment butting device engagement portion and the cover butting device engagement portion, to connect the equipment butting device engagement portion and the cover butting device engagement portion; or the equipment butting device engagement portion is provided with a recessed portion, and a shape of the recessed portion corresponds to a shape of the cover butting device engagement portion so that the cover butting device engagement portion is insertable into the recessed portion, to connect the equipment butting device engagement portion and the cover butting device engagement portion; or a snap member is provided on an inner surface of the equipment butting device engagement portion, a snap slot is provided on an outer surface of the cover butting device engagement portion, and the snap member is capable of being snapped into the snap slot to connect the equipment butting device engagement portion and the cover butting device engagement portion.

9. The lithium slurry battery system according to claim 1, wherein the cover butting device is provided with a guide post, and the equipment butting device is provided with a guide hole, and the guide post is inserted into the guide hole to locate the cover butting device and the equipment butting device.

10. The lithium slurry battery system according to claim 1, wherein
the lithium slurry battery comprises a monitoring device arranged in the case of the lithium slurry battery;
the maintenance and regeneration equipment comprises a control device;
the cover butting device is provided with a cover data transmission port; and
the equipment butting device is provided with a device data transmission port, wherein
the cover data transmission port is connected to the monitoring device of the lithium slurry battery;
the device data transmission port is connected to the control device of the equipment butting device; and
the cover data transmission port is capable of butting against the device data transmission port to transmit data detected by the monitoring device to the control device.

11. The lithium slurry battery system according to claim 1, wherein
the gas recovery storage tank of the maintenance and regeneration equipment is connected to the first equipment port via a first gas pipeline and a first header pipe or is connected to the second equipment port via the first gas pipeline and a second header pipe;
the gas storage tank of the maintenance and regeneration equipment is connected to the first equipment port via a second gas pipeline and the first header pipe;
the liquid recovery storage tank of the maintenance and regeneration equipment is connected to the second equipment port via a first liquid pipeline and the second header pipe;
the liquid storage tank of the maintenance and regeneration equipment is connected to the second equipment port via a second liquid pipeline and the second header pipe or is connected to the first equipment port via the second liquid pipeline and the first header pipe; and
the maintenance and regeneration equipment further comprises:
a first gas control valve arranged on the first gas pipeline and configured to control gas in the lithium slurry battery to flow into the gas recovery storage tank via the first equipment port, the first header pipe and the first gas pipeline or via the second equipment port, the second header pipe and the first gas pipeline;

a second gas control valve arranged on the second gas pipeline and configured to control gas in the gas storage tank to flow into the lithium slurry battery via the second gas pipeline, the first header pipe and the first equipment port;

a first liquid control valve arranged on the first liquid pipeline and configured to control liquid in the lithium slurry battery to flow into the liquid recovery storage tank via the second equipment port, the second header pipe and the first liquid pipeline; and a second liquid control valve arranged on the second liquid pipeline and configured to control liquid in the liquid storage tank to flow into the lithium slurry battery via the second liquid pipeline, the second header pipe and the second equipment port or via the second liquid pipeline, the first header pipe and the first equipment port.

12. The lithium slurry battery system according to claim 11, wherein the liquid storage tank comprises:

a first electrolyte storage tank for storing an electrolyte, wherein the electrolyte is a mixture of a lithium salt with a solvent;

a cleaning liquid storage tank for storing a cleaning liquid, wherein the cleaning liquid is an ester cleaning agent, a carbonic ester derivative cleaning agent, an ether cleaning agent, or a ketone cleaning agent; and a second electrolyte storage tank for storing an electrolyte containing an additive for stabilizing and repairing an SEI film, wherein the first electrolyte storage tank, the cleaning liquid storage tank and the second electrolyte storage tank are respectively in communication with the second liquid pipeline via a switching valve or liquid control valves;

the additive for stabilizing and repairing an SEI film comprises at least one of: a sulfinyl additive, a sulfonate ester additive, vinylene carbonate, anisole or halogenated derivative thereof, a halogenated organic, and an inorganic additive;

the inorganic additive is sulfur dioxide, carbon dioxide or lithium carbonate; and the gas storage tank stores dry gas, wherein the dry gas comprises at least one of nitrogen, air, noble gas and sulfur hexafluoride gas, and moisture content of the dry gas is less than or equal to 1 ppm.

13. The lithium slurry battery system according to claim 11, wherein the maintenance and regeneration equipment further comprises:

a vacuum device arranged on the first gas pipeline and configured to vacuumize the lithium slurry battery via the first equipment port or the second equipment port; and a first liquid pump arranged on the first liquid pipeline and configured to suction the liquid in the lithium slurry battery via the second equipment port.

14. The lithium slurry battery system according to claim 13, wherein the maintenance and regeneration equipment further comprises a gas-driving device, the gas-driving device is arranged on the second gas pipeline and is connected to the liquid storage tank via a gas-driving pipeline, and the gas-driving device is configured to: drive the gas in the gas storage tank to flow into the lithium slurry battery via the first equipment port and the first cover port of the lithium slurry battery; and drive the gas in the gas storage tank to flow into the liquid storage tank and further drive the liquid in the liquid storage tank to flow into the lithium slurry battery via the second equipment port and the second cover port of the lithium slurry battery or via the first equipment port and the first cover port of the lithium slurry battery; or the maintenance and regeneration equipment further comprises a gas-driving device and a second liquid pump, the gas-driving device is arranged on the second gas pipeline and is configured to drive the gas in the gas storage tank to flow into the lithium slurry battery via the first equipment port and the first cover port of the lithium slurry battery, and the second liquid pump is arranged on the second liquid pipeline and is configured to drive the liquid in the liquid storage tank to flow into the lithium slurry battery via the second equipment port and the second cover port of the lithium slurry battery or via the first equipment port and the first cover port of the lithium slurry battery.

15. The lithium slurry battery system according to claim 11, wherein the maintenance and regeneration equipment further comprises:

a third gas pipeline, wherein the third gas pipeline and the first header pipe connect the first equipment port to the gas recovery storage tank, or the third gas pipeline and the second header pipe connect the second equipment port to the gas recovery storage tank; and a third gas control valve is arranged on the third gas pipeline, and in a case that a gas pressure in the lithium slurry battery is greater than a preset gas pressure, the gas in the lithium slurry battery flows into the gas recovery storage tank via the first equipment port, the first header pipe, the third gas pipeline and the third gas control valve or via the second equipment port, the second header pipe, the third gas pipeline and the third gas control valve.

16. The lithium slurry battery system according to claim 1, wherein the lithium slurry battery further comprises:

a discharging device, arranged in the case of the lithium slurry battery and comprising a seepage support portion and a suction portion, wherein the cell core is arranged on the seepage support portion, and a peripheral sidewall of the cell core is hermetically connected to the seepage support portion;

the seepage support portion is provided with a seepage space and a discharging passage in fluid communication with the seepage space;

the discharging passage is in fluid communication with one end of the suction portion, and the other end of the suction portion is connected to the second cover port of the cover; and fluid in the cell core flows downwards into the seepage space of the seepage support portion, and a suction process is performed at the second cover port of the cover to discharge the fluid in the seepage space of the seepage support portion from the lithium slurry battery via the discharging passage, the suction portion and the second cover port.

17. The lithium slurry battery system according to claim 16, wherein the peripheral sidewall of the cell core is hermetically connected to the seepage support portion by using a sealing glue, a sealing strip or a sealing ring, and wherein the seepage support portion is provided with a planar top surface, and a part of the peripheral sidewall of the cell core adjacent to a bottom of the cell core is hermetically connected to the top surface of the seepage support portion; or the seepage support portion is provided with a vertical sidewall surrounding the cell core and having a height equal to or less than a height of the cell core, and an upper end portion of the vertical sidewall is hermetically connected to the peripheral sidewall of the cell core; or the seepage support portion is provided with a recess having a size corresponding to the cell core to accommodate the cell core, and a sidewall of the recess is hermetically connected to the peripheral sidewall of the cell core.

18. The lithium slurry battery system according to claim 16, wherein the seepage support portion is a support plate provided with a guide groove, with the guide groove being in fluid communication with the discharging passage on a sidewall of the support plate; or the seepage support portion is a base, the base comprises a base sidewall protruding from a peripheral edge of the base, a support table and a guide cavity, the support table is located inside the base sidewall, the guide cavity is located in the middle of the base, and the cell core is hermetically connected to the support table, and fluid in the guide cavity is discharged via the discharging passage in the support table and the base sidewall.

19. The lithium slurry battery system according to claim 16, wherein the seepage support portion comprises a guide plate having a height of h, and the guide plate is provided with a plurality of inclined grooves each having a depth increasing sequentially from zero and equal to or less than the height h of the guide plate; or the seepage support portion comprises a guide plate having a height of h, and a top surface of the guide plate is an inclined surface converging at a convergence point, wherein the convergence point is located on an edge of the guide plate at a height lower than the height h of the guide plate.

20. The lithium slurry battery system according to claim 19, wherein the seepage support portion further comprises a seepage plate arranged on the guide plate and fixed to the guide plate, the seepage plate is provided with a plurality of through holes, and an electrolyte in the cell core flows to the guide plate via the through holes of the seepage plate and further flows into the suction portion under guide of the guide plate.

21. The lithium slurry battery system according to claim 16, wherein the suction portion comprises a vertical suction portion and a horizontal suction portion, and wherein the vertical suction portion is a vertical suction box having a trapezoidal shape, and the horizontal suction portion is a horizontal suction box having a rectangle shape, wherein a lower end portion of the vertical suction box is connected to and in fluid communication with the discharging passage of the seepage support portion, one end of the horizontal suction box is connected to a top end of the vertical suction box, and an opening at the other end of the horizontal suction box is connected to the second cover port of the cover; or the vertical suction portion is a vertical wall provided with a vertical passage, and the horizontal suction portion is a horizontal strip provided with a horizontal passage, wherein a lower end portion of the vertical passage of the vertical wall is connected to and in fluid communication with the discharging passage of the seepage support portion, one end of the horizontal passage of the horizontal strip is in fluid communication with the vertical passage of the vertical wall, and the other end of the horizontal passage of the horizontal strip is in fluid communication with the second cover port of the cover.

* * * * *